US011865456B2

(12) United States Patent
Lu et al.

(10) Patent No.: US 11,865,456 B2
(45) Date of Patent: Jan. 9, 2024

(54) METHOD AND APPARATUS FOR PROVIDING MULTI-PLAYER ROOM, DEVICE, AND MEDIUM

(71) Applicant: TENCENT TECHNOLOGY (SHENZHEN) COMPANY LIMITED, Shenzhen (CN)

(72) Inventors: Xuejun Lu, Shenzhen (CN); Mingfeng Pan, Shenzhen (CN); Ziqian Shi, Shenzhen (CN); Haijun Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 267 days.

(21) Appl. No.: 17/334,885

(22) Filed: May 31, 2021

(65) Prior Publication Data
US 2021/0283508 A1 Sep. 16, 2021

Related U.S. Application Data

(63) Continuation of application No. PCT/CN2020/097745, filed on Jun. 23, 2020.

(30) Foreign Application Priority Data

Jun. 28, 2019 (CN) .......................... 201910578240.2

(51) Int. Cl.
A63F 13/77 (2014.01)
A63F 13/335 (2014.01)
(Continued)

(52) U.S. Cl.
CPC ............ A63F 13/77 (2014.09); A63F 13/335 (2014.09); A63F 13/792 (2014.09); A63F 13/795 (2014.09)

(58) Field of Classification Search
CPC ...... A63F 13/77; A63F 13/335; A63F 13/792; A63F 13/795; A63F 13/352; A63F 13/48;
(Continued)

(56) References Cited

U.S. PATENT DOCUMENTS 7,917,583 B2 * 3/2011 Angiolillo ........ H04N 21/44222
709/204
2008/0227553 A1 * 9/2008 Leifenberg .............. A63F 13/12
463/42
(Continued)

FOREIGN PATENT DOCUMENTS

CN 101155044 A 4/2008
CN 102254098 A 11/2011
(Continued)

OTHER PUBLICATIONS

My Mate Vince, "Nintendo Switch: How To buy a Game from Nintendo eShop for beginners.", https://www.youtube.com/watch?v=IUJGgeVuv30, Jun. 30, 2017. (Year: 2017).*
(Continued)

Primary Examiner — Michael A Cuff
(74) Attorney, Agent, or Firm — ANOVA LAW GROUP, PLLC

(57) ABSTRACT

A method for providing a cloud room is made applicable to a cloud server. The method includes: receiving from a client a creation request for the cloud room, the creation request carrying configuration information of the cloud room, the cloud room being used by at least two clients to perform a multi-player game; creating and configuring the cloud room in the cloud server according to the configuration information, the cloud room being configured to run the multi-player game; receiving from the client an access request for the cloud room; and starting the cloud room according to the access request, and connecting the client to the cloud room.

20 Claims, 17 Drawing Sheets

(51) Int. Cl.
*A63F 13/792* (2014.01)
*A63F 13/795* (2014.01)

(58) Field of Classification Search
CPC ...... A63F 13/35; A63F 13/70; H04L 41/0816;
H04L 41/0806; H04L 41/5051; H04L
41/5054; H04L 41/082; H04L 41/0893;
H04L 67/10; H04L 67/131; H04L 67/34;
H04L 67/104; H04L 67/51
USPC .......................................................... 463/42
See application file for complete search history.

(56) References Cited

U.S. PATENT DOCUMENTS

| | | | | |
|---|---|---|---|---|
| 2011/0256917 | A1* | 10/2011 | Andersson | G07F 17/3225 463/17 |
| 2013/0203480 | A1* | 8/2013 | DeYoung | A63F 13/20 463/23 |
| 2014/0187315 | A1 | 7/2014 | Perry | |
| 2014/0274407 | A1 | 9/2014 | Calippe et al. | |
| 2016/0269828 | A1* | 9/2016 | Smith | H04R 3/04 |

FOREIGN PATENT DOCUMENTS

| | | | |
|---|---|---|---|
| CN | 103391283 | A | 11/2013 |
| CN | 104363476 | A | 2/2015 |
| CN | 105194874 | A | 12/2015 |
| CN | 106096952 | A | 11/2016 |
| CN | 106101132 | A | 11/2016 |
| CN | 106422324 | A | 2/2017 |
| CN | 109582472 | A | 4/2019 |
| CN | 110213298 | A | 9/2019 |
| KR | 20060126471 | A | 12/2006 |
| KR | 20100028798 | A | 3/2010 |
| KR | 20100028977 | A | 3/2010 |
| KR | 20110103203 | A | 9/2011 |
| KR | 20130104570 | A | 9/2013 |
| WO | 2013069912 | A1 | 5/2013 |

OTHER PUBLICATIONS

The European Patent Office (EPO) Extended Search Report for EP Application No. 20833230.4 dated Jul. 4, 26, 2022 7 Pages.
Japan Patent Office (JPO) The Office Action For JP Application No. 2021-544640 dated Sep. 5, 2022 10 Pages (Translation Included).
"[Minecraft] Let's build a Minecraft server with ConoHaVPS!", https://minecraft-blog.net/?p=6968#toc3.
Indian Patent Office xamination report for Application No. 202137028043 dated Mar. 14, 2022 6 pages.
Korean Intellectual Property Office (KIPO) Office Action 1 for Application No. 10-2021-7025419 dated Jul. 20, 2022 11 pages (including translation).
The World Intellectual Property Organization (WIPO) International Search Report for PCT/CN2020/097745 dated Sep. 15, 2020 5 Pages (including translation).
The State Intellectual Property Office of the People's Republic of China (SIPO) Office Action 1 for for 201910578240.2 dated Oct. 2, 30, 2020 11 Pages (including translation).

* cited by examiner

METHOD AND APPARATUS FOR PROVIDING MULTI-PLAYER ROOM, DEVICE, AND MEDIUM

RELATED APPLICATION(S)

This application is a continuation application of PCT Patent Application No. PCT/CN2020/097745, filed on Jun. 23, 2020, which claims priority to Chinese Patent Application No. 201910578240.2, entitled "METHOD AND APPARATUS FOR PROVIDING MULTI-PLAYER ROOM, DEVICE, AND MEDIUM", filed on Jun. 28, 2019, all of which are incorporated by reference in entirety.

FIELD OF THE TECHNOLOGY

The present disclosure relates to the field of computer networks, and in particular, to a method and apparatus for providing a multi-player room, a device, and a medium.

BACKGROUND

A multi-player game is a type of game that connects at least two users to interact and compete through a network. The network includes a network and a local area network formed by a peer-to-peer network (P2P Network) structure.

In a multi-player game for multi-player services through the P2P network, a user creates a multi-player room to play games with other users. The user that creates the multi-player room is an owner or an administrator of the multi-player room, and can perform, on the multi-player room, operations such as adding, deleting, modifying, closing, and setting a number of members that the multi-player room can accommodate, and the like. A terminal is selected as a server of the P2P network from terminals used by connected users. The selected terminal requires a higher hardware configuration, so that all users in the multi-player game can play the game smoothly.

In certain of the above situations, if performance of the multi-player room is poor due to poor hardware performance of the selected terminal or a bad network environment in which the terminal is located, the users in the multi-player game may not be able to play or fully enjoy the game.

SUMMARY

Embodiments of the present disclosure provide a method and apparatus for providing a multi-player room, a device, and a medium, which can effectively reduce requirements for hardware performance of a terminal as a server and a network environment in which the terminal is located, improving performance of the multi-player room, so that users in the multi-player game can play the game more smoothly. The technical solutions are as follows.

In one aspect, the present disclosure provides a method for providing a cloud room, applicable to a cloud server, the method including: receiving from a client a creation request for the cloud room, the creation request carrying configuration information of the cloud room, and the cloud room being used by at least two clients to perform a multi-player service; creating and configuring the cloud room in the cloud server according to the configuration information; receiving from the client an access request for the cloud room that is transmitted by the client; and starting the cloud room according to the access request, and connecting the client to the cloud room.

In another aspect, the present disclosure provides an apparatus for providing a cloud room, the apparatus comprising: a memory storing computer program instructions; and a processor coupled to the memory and configured to execute the computer program instructions and perform: receiving from a client a creation request for the cloud room, the creation request carrying configuration information of the cloud room, the cloud room being used by at least two clients to perform a multi-player service; creating and configuring the cloud room in the cloud server according to the configuration information; receiving from the client an access request for the cloud room; and starting the cloud room according to the access request, and connecting the client to the cloud room.

In yet another aspect, the present disclosure provides a non-transitory computer-readable storage medium storing computer program instructions executable by at least one processor to perform: receiving from a client a creation request for the cloud room, the creation request carrying configuration information of the cloud room, the cloud room being used by at least two clients to perform a multi-player service; creating and configuring the cloud room in the cloud server according to the configuration information; receiving from the client an access request for the cloud room; and starting the cloud room according to the access request, and connecting the client to the cloud room.

In yet another aspect, the present disclosure provides an apparatus for providing a cloud room, the apparatus including a cloud room generation module, the cloud room generation module being configured to receive from a client a creation request for the cloud room, the creation request carrying configuration information of the cloud room, the cloud room being used by at least two clients to perform a multi-player service; the cloud room generation module being configured to create and configure the cloud room in a cloud server according to the configuration information; the cloud room generation module being configured to receive from the client an access request for the cloud room; and the cloud room generation module being configured to start the cloud room according to the access request, and connect the client to the cloud room.

The technical solutions provided in the embodiments of the present disclosure achieve at least the following beneficial effects:

The client transmits, to the cloud server, the creation request carrying the configuration information of the cloud room to create the cloud room, so that the client can perform the multi-player service in the cloud room. When or in response to determining it may be desirable to perform different types of multi-player services, the client may only need to transmit the configuration information corresponding to the type of the multi-player service to the cloud server, so that different types of multi-player services can be performed in the cloud room, which simplifies the way the client creates the cloud room, and the client may not need to repeatedly transmit a creation request to create a new room.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DESCRIPTION OF EMBODIMENTS

Figure 1:
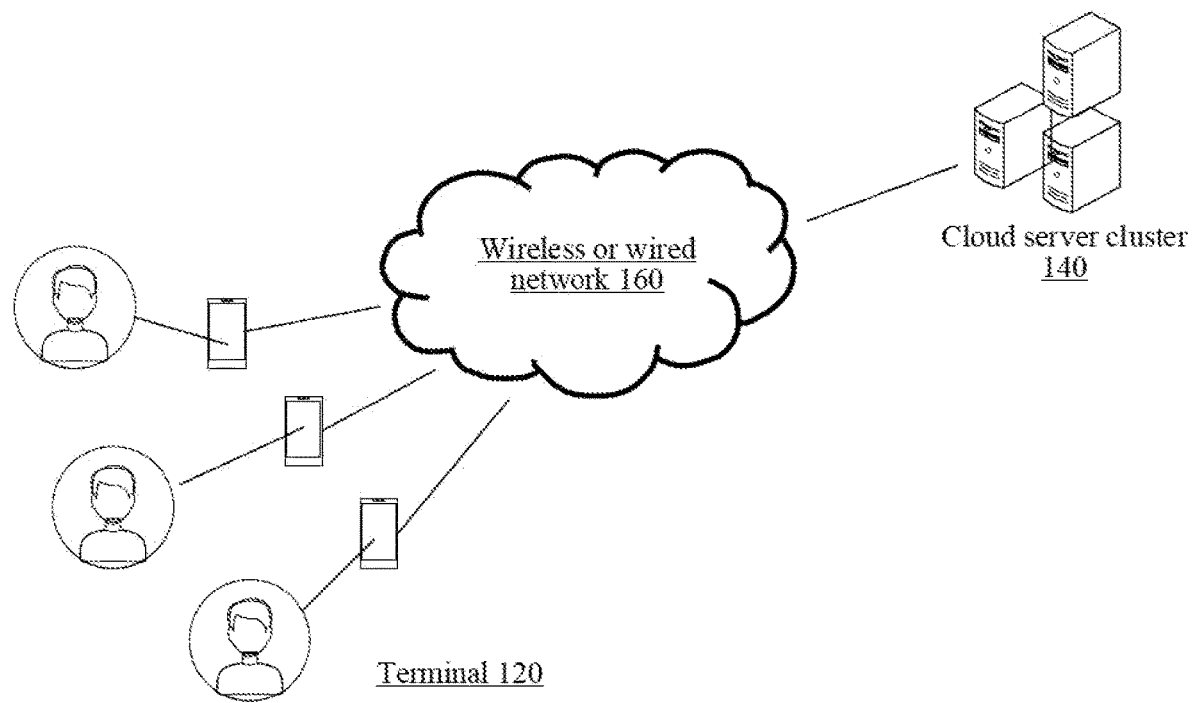
FIG. 1 is a block diagram of an implementation environment of a cloud server according to an exemplary embodiment of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

First, terms involved in certain embodiments of the present disclosure are introduced:

A peer-to-peer network (P2P Network) architecture refers to a distributed application architecture that partitions tasks and workloads between peers, which is a networking or network mode formed by a P2P computer model at an application layer. In a client—server model, data is distributed by using a proprietary server, and a plurality of clients obtain data from the server. In the P2P network architecture, each client is a server, and there is no centralized server, and each client can request services (obtain data) from other clients, or provide services (transmit data) to other clients.

A multi-player game is a game that connects at least two users to play the game through a network. A player creates a room in the game, and other players join the room to play together. The player who creates the room is an owner or an administrator of the room and can manage the room, for example, modify a name of the room and modify a number of members that the room can accommodate. A computer used by the owner is equivalent to a physical server in the room, and other players obtain data from the computer used by the owner.

A multi-player service is an event or a service jointly handled by at least two users that are connected through a network. A user creates a cloud room, and other users that handle the event join the cloud room to handle the event. The user who creates the room is an owner or an administrator of the room and can manage the room, for example, modify a name of the room and modify a number of members that the room can accommodate.

A cloud server (Elastic Computer Service, ESC) is a server that can provide simple, efficient, and elastically scalable computing services. Management of the cloud server is simpler and more efficient than that of a physical server. Users obtain the right to use the cloud server through purchase or lease and can quickly create or release computing resources on any plurality of cloud servers without necessarily needing to purchase hardware in advance.

A cloud room is a room built in a cloud server. In a multi-player service, by using a cloud server with stronger capacity of computing resources and storage resources to build a room, users can create its own cloud room for the multi-player service, so that the users can communicate with each other through the cloud server and provide the users with better game experience. In the multi-player service, a cloud server with stronger capacity of computing resources and storage resources is used for building a cloud room, so that the users can communicate with each other through the cloud server and provide a better environment for collaboratively handling an event for the users. In the embodiments provided in the present disclosure, the cloud room can be accessed by purchasing, renting, asking for or giving away, participating in a lottery, and the like.

A heartbeat signal means that one of the two communication parties (a transmitter) transmits a data packet to the other party at regular intervals, and the other party (a receiver) determines, according to requirements, whether to transmit a data packet back to the transmitter upon receipt of the information, the data packet carrying information. The heartbeat signal is used for confirming whether the two communication parties are still online and able to communicate without communicating with each other for a long time, or whether a communication line between the two parties has been disconnected.

The method provided in the present disclosure may be applicable to create a multi-player room in a multi-player service or a multi-player game. The method is to be described below in combination with the implementation environment of the multi-player room.

FIG. 1 is a block diagram of an implementation environment of a method for providing a multi-player room according to an exemplary embodiment of the present disclosure. The implementation environment includes: a terminal 120, a cloud server cluster 140, and a communication network 160.

The terminal 120 is connected to the cloud server cluster 140 through a wireless network or a wired network 160. An application program corresponding to a multi-player service or a multi-player game is installed and operates in the terminal 120, and the application program also has a function of connecting with other users.

In certain embodiments, an application program that supports operation of the multi-player service or the multi-player game is also installed and operates in the terminal 120, and a first account or a second account can be used for logging in to the application program.

In certain embodiments, the terminal 120 may be at least one of a smart phone, a game console, a desktop computer, a tablet computer, an e-book reader, a moving picture experts group audio layer III (MP3) player, and a moving picture experts group layer IV (MP4) player, and a laptop computer.

The cloud server cluster 140 includes at least one of one server, a plurality of servers, a cloud computing platform, and a virtualization center. The cloud server cluster 140 is configured to provide backend services for applications with augmented reality functions. In certain embodiments, the cloud server cluster 140 is in charge of primary computing, and the terminal 120 is in charge of secondary computing. Alternatively, the cloud server cluster 140 is in charge of secondary computing work, and the terminal 120 is in charge of primary computing. Alternatively, a distributed computing architecture is adopted between the cloud server cluster 140 and the terminal 120 to perform collaborative computing.

In certain embodiments, the cloud server cluster 140 includes: an access server and a backend server. The access server is configured to provide an access service and an information receiving/transmitting service for the terminal 120, and forward valid information between the terminal 120 and the backend server. The backend server is configured to provide a backend service of an application, for example, at least one of communication services, collaboration services, matching services, ranking generation services, online services, and account management services, and there may be one or more backend servers. When there are a plurality of backend servers, there is at least one of the following forms. There are at least two backend servers configured to provide different services, and there are at least two backend servers configured to provide the same service, which is not limited in the embodiment of the present disclosure.

For the wireless or wired network 160, the wired network may be a metropolitan area network, a local area network, an optical fiber network, or the like, and the wireless network may be a mobile communication network (for example, at least one of 2G, 3G, 4G, or 5G) or a wireless fidelity (Wi-Fi) network.

Figure 2:
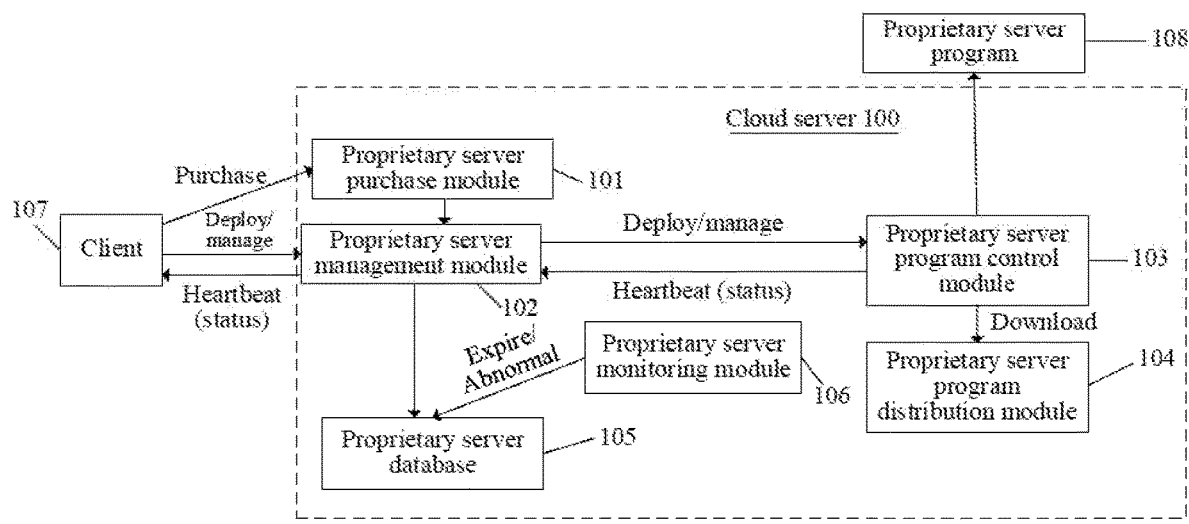
FIG. 2 is a block diagram of a system structure of a cloud server according to one or more embodiments of the present disclosure.

FIG. 2 is a block diagram of a structure of a cloud server according to an exemplary embodiment of the present disclosure. The structure of the cloud server is the structure of the cloud server cluster shown in FIG. 1. A cloud room can be created and configured in the cloud server 100. The cloud room is used by at least two clients to perform a multi-player service or a multi-player game. The cloud server 100 includes: a proprietary server purchase module 101, a proprietary server management module 102, a proprietary server program control module 103, a proprietary server program distribution module 104, a proprietary server database 105, and a proprietary server monitoring module 106.

The proprietary server management module 102 is a module configured to generate an instruction to manage or deploy a cloud room and view a list of cloud rooms purchased by users, and can receive a request transmitted by a client and transmit information to the client. The proprietary server management module 102 is a medium for information transfer between the user and the proprietary server program control module 103.

The proprietary server program control module 103 is a module that can open, close, or restart the cloud room, install programs, download programs, modify programs, add programs, delete programs, and update programs, and can receive an instruction transmitted by the proprietary server management module 102, and perform related operations on the cloud room according to the corresponding instruction.

A proprietary server program is a program provided by a multi-player service platform or a game platform, a game developer, and a game supplier. The program is generally provided to the proprietary server program control module in the cloud server in the form of an installation package.

The proprietary server purchase module 101 is a module that can provide services to a user when the user purchases or rents a cloud room, for example, receive a purchase request of the user, generate a purchase order, provide payment services, instruct the proprietary program management module to assign a cloud room to the user that purchases the cloud room, and the like.

The proprietary server monitoring module 106 is a module that monitors an operation status of the cloud room, which can monitor a heartbeat signal (that is, the operation status) of the cloud room, remind the user of an abnormal condition when the cloud room operates abnormally, or remind the user to update the proprietary server program as required, or remind the user to renew upon expiration of the right to use the cloud room of the user.

The proprietary server database 105 is a database that stores related information of the cloud room, for example, an operation status of the cloud room, configuration information of the cloud room, modification information of the proprietary server program, or the like.

The proprietary server program distribute module 104 is a module configured to store a program provided by a multi-player service platform or a game platform, a game developer, or a game supplier. The proprietary server program control module 103 queries the proprietary server program distribution module 104 for the proprietary server program corresponding to the type of the multi-player game.

In some embodiments, the client 107 transmit a purchase request to the proprietary server purchase module 101 in the cloud server 100, and the client 107 may alternatively transmit a lease request to the proprietary server purchase module 101. The type of request from the client is not limited in the present disclosure. The proprietary server purchase module 101 generates a purchase order according to the purchase request of the client on the game platform, and transmits the purchase order to the proprietary server management module 102. The purchase request of the client 107 is also the creation request of the cloud room, and the creation request of the client 107 carries the configuration information of the cloud room. The proprietary server management module 102 transmits an installation instruction to the proprietary server program control module 103 according to the paid purchase order of the client 107 and the configuration information of the cloud room. The installation instruction is used by the proprietary server program control module 103 to install a proprietary server program 108 corresponding to the multi-player service or the multi-player game in the cloud room. The paid purchase order is a purchase order for which a payment has been made. The proprietary server program 108 is provided by a multi-player service platform or a game platform, a game developer, and a game supplier.

In certain embodiments, the proprietary server program is a game program, or a program that supports the multi-player service, or a collaborative program, or a program that supports collaborative functions. In certain embodiments, the proprietary server program is a multi-player service or a multi-player game application program, an installation package of a multi-player service or a multi-player game application program, or a compressed package of a multi-player service or a multi-player game program. The format of the proprietary server program 108 is not limited in the present disclosure.

In certain embodiments, the proprietary server program control module 103 directly transmits a download request to the proprietary server program 108. In an example, the proprietary server program 108 puts the installation package of the corresponding program into the proprietary server program distribution module 104, and the proprietary server program control module 103 transmits a download request to the proprietary server program distribution module 104, as shown in FIG. 2.

In response to successful installation of the proprietary server program 108 corresponding to the multi-player service or the multi-player game in the cloud room, the proprietary server program control module 103 generates a configuration instruction corresponding to the cloud room, configures the cloud room according to the configuration instruction, and transmits the information about successful configuration of the cloud room to the proprietary server management module 102, and the proprietary server management module transmits the information about successful configuration of the cloud room to the client 107. An interface which shows that the cloud room has been created and successfully configured is displayed on the client 107, and the client 107 can perform multi-player services or multi-player games through the cloud room.

When there is an update program in the proprietary server program 108, the proprietary server management module 102 generates a closing instruction and transmits the closing instruction to the proprietary server program control module 103. The proprietary server program control module 103 closes the cloud room according to the closing instruction. The proprietary server management module 102 generates an update instruction and transmits an update instruction to the proprietary server program control module 103, and the proprietary server program control module 103 installs an update program corresponding to the multi-player game in the cloud room according to the update instruction. In certain embodiments, the proprietary server program control module 103 transmits a download request to the proprietary server program 108, or transmits a download request to the proprietary server program distribution module 104. Upon the successful update, the proprietary server management module 102 generates a start instruction, and transmits the start instruction to the proprietary server program control module 103, and the proprietary server program control module 103 starts the cloud room according to the start instruction.

After the client 107 accesses the cloud room, when or in response to determining the configuration of the cloud room may need to be modified, the client 107 transmits a configuration modification request for a cloud room to the proprietary server management module 102, the proprietary server management module 102 generates a closing instruction and transmits the closing instruction to the proprietary server program control module 103, and the proprietary server program control module 103 closes the cloud room according to the closing instruction. The proprietary server management module 102 generates a configuration modification instruction according to the configuration modification request of the client 107, and transmits the configuration modification instruction to the proprietary server program control module 103, and the proprietary server program control module 103 modifies the configuration information of the cloud room according to the configuration modification instruction.

In certain embodiments, the configuration information of the cloud room includes at least one of the following information: types of multi-player services (for example, processing of a document, data, a video, an audio, a picture, an animation, and the like, or remote teaching, or voice or video calls), types of multi-player games (for example, racing, adventure, shooting, fighting, strategy, management and development, and the like), initialization configuration parameters (for example, a name of the cloud server, content of multi-player services, a game style, a number of players or users, a cover of the cloud server, parameters of the game world, and the like), a name of the cloud room, and the like.

Upon the successful modification of the configuration information of the cloud room, the proprietary server management module 102 generates a start instruction, and transmits the start instruction to the proprietary server program control module 103, and the proprietary server program control module 103 starts the cloud room according to the start instruction. The started cloud room is the cloud room whose configuration information has been successfully modified.

The proprietary server program management module 103 transmits a heartbeat signal to the proprietary server management module 102 at a certain frequency. The heartbeat signal refers to an operation status of the cloud room, including: a normal status and an abnormal status. The proprietary server management module 102 receives the heartbeat signal and transmits the heartbeat signal to the proprietary server database 105, and the proprietary server monitoring module 106 reads the heartbeat signal from the proprietary server database 105. When the operation status is abnormal, the proprietary server management module 102 generates a closing instruction or a restart instruction, and transmits the closing instruction or the restart instruction to the proprietary server program control module 103, and the proprietary server program control module 103 closes or restarts the cloud room according to the closing instruction or the restart instruction. The cloud room is to run normally after being closed or restarted. In addition, the proprietary server monitoring module 106 monitors a validity period for the client 107 to access the cloud room, and transmits a prompting request to the client 107 when the validity period exceeds a target moment. The client 107 receives the prompt and renews the cloud room, so that the cloud room can continue to be used.

In certain embodiments, the division of the structure of the cloud server by the above modules is only exemplary, and a person skilled in the art may divide the cloud server into other structures according to the method.

The above "proprietary server" means that the user can distribute the resources of the server after having permission to use the cloud room. In some embodiments, the "proprietary server" is also named a "cloud server", which is not limited in the present disclosure.

Figure 3:
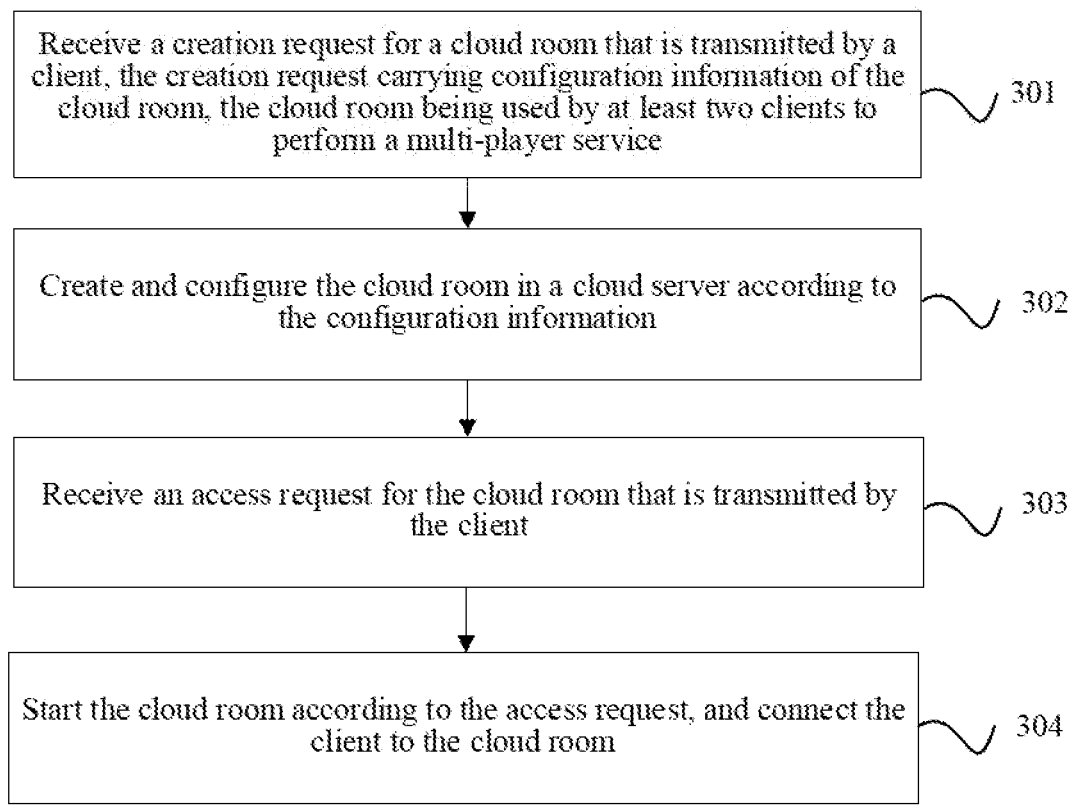
FIG. 3 is a flowchart of a method for providing a multi-player room according to one or more embodiments of the present disclosure.

FIG. 3 is a flowchart of a method for providing a multi-player room according to an exemplary embodiment of the present disclosure. The method is applicable to the cloud server cluster 140 shown in FIG. 1. The method includes the following steps:

Step 301: Receive a creation request for a cloud room that is transmitted by a client, the creation request carrying configuration information of the cloud room, and the cloud room being used by at least two clients to perform a multi-player service.

The cloud server receives the creation request for a cloud room that is transmitted by a client, the creation request carrying the configuration information of the cloud room. The configuration information includes: a type of the multi-player service and an initialization configuration parameter, the cloud room being used by at least two clients to perform a multi-player service.

In certain embodiments, a type of the multi-player service includes: at least one of file processing (for example, processing of a document, data, a video, an audio, a picture, an animation, and the like), transmission of information (for example, remote teaching, voice or video calls, video or audio conferences), charging or payment, and the like. In an example, the type of the multi-player service is file processing.

In certain embodiments, the initialization configuration parameter includes: at least one of a name of the cloud server, the type of multi-player service, a number of users, a cover of the cloud server, and the parameters of the multi-player service.

Step 302: Create and configure the cloud room in the cloud server according to the configuration information.

The cloud room is used for the multi-player service. The cloud server creates a cloud room according to the configuration information, installs a proprietary server program corresponding to the multi-player service in the cloud room, and in response to successful installation of the proprietary server program, starts the proprietary server program, and configures the proprietary server program.

In certain embodiments, a cloud room is created for at least one client. In certain embodiments, at least one cloud room can be created for each client. A number of clients for which the cloud room is created and a number of cloud rooms created for the clients are not limited in the present disclosure. In an example, one cloud room is created for one client.

Step 303: Receive an access request for the cloud room that is transmitted by the client.

In response to successful creation of the cloud room, the client transmits an access request to the cloud server, and the cloud server receives the access request transmitted by the client.

In certain embodiments, at least one client transmits the access request. In certain embodiments, the cloud server receives an access request transmitted by at least one client. In an example, two clients transmit access requests. In an example, the cloud server receives the access requests transmitted by the two clients.

Step 304: Start the cloud room according to the access request, and connect the client to the cloud room.

The cloud server starts the cloud room according to the access request transmitted by the client, and connects the client to the cloud room.

In certain embodiments, the cloud server starts the cloud room according to the access request transmitted by at least one client. In certain embodiments, at least one client is accessed to the cloud room. In an example, the cloud server starts the cloud room according to an access request transmitted by one client. In an example, the cloud server connects two clients to the cloud room, and the two clients perform a multi-player service in the cloud room.

Based on the above, according to the method provided in this embodiment, the client creates and configures the cloud room in the cloud server, so that at least two clients can perform the multi-player service. When or in response to determining different types of multi-player services may need to be performed, the client may only need to transmit the configuration information corresponding to the type of the multi-player service to the cloud server to perform different types of multi-player services in the cloud room, avoiding the problem that the client may need to recreate the cloud room according to different types of multi-player services.

The working process of the cloud server is described in combination with the flowchart of the cloud server creating a cloud room, modifying the configuration information of the cloud room, and deleting the configuration information of the cloud room.

Figure 4:
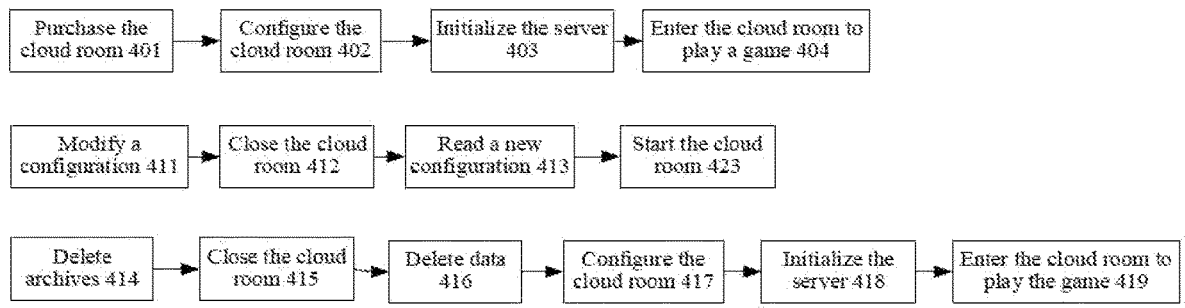
FIG. 4 is a flowchart of creating and configuring a cloud room according to one or more embodiments of the present disclosure.

FIG. 4 is a flowchart of creating and configuring a cloud room according to another exemplary embodiment of the present disclosure.

401 of purchasing a cloud room includes: generate a purchase order for the cloud room according to a purchase request, the purchase order being used for requesting the client to transfer a resource, the resource transfer being transferring a resource paid for purchasing the cloud room corresponding to the purchase order to an account of a provider of the cloud room, and create the cloud room in the cloud server upon a successful transfer of the resource corresponding to the purchase order.

402 of configuring the cloud room includes: install a proprietary server program corresponding to a multi-player game in the cloud room according to a type of the multi-player game, and start the proprietary server program in response to successful installation of the proprietary server program, and configure the proprietary server program.

Figure 5:
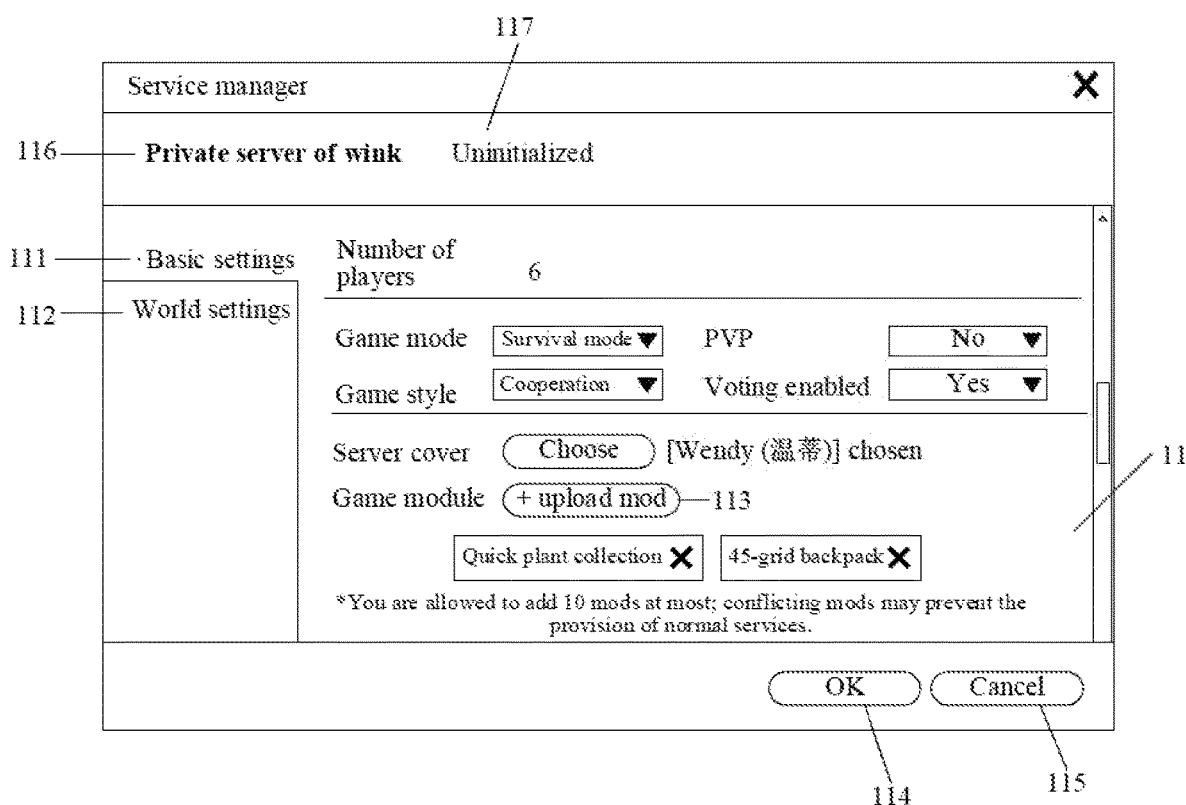
FIG. 5 is a schematic diagram of an interface of configuration information of the cloud room according to one or more embodiments of the present disclosure.

The configuring the cloud room is described with reference to FIG. 5. FIG. 5 is a schematic diagram of an interface of configuration information of the cloud room according to an exemplary embodiment of the present disclosure. The following options are displayed on the interface 11 of configuration information: basic setting 111, world setting 112, upload game module (mod) 113, OK 114, cancel 115, name of cloud room (or name of cloud server) 116, and status of cloud room (or status of proprietary server) 117.

The basic setting 111 is configured to set a number of players (a number of users), a game mode, a battle mode (PVP), and a game style, and turn on a voting function, and further configured to set a proprietary server cover and upload a game module. In certain embodiments, at least two users perform a multi-player game in the same cloud room. In an example, six users perform a multi-player game in the same cloud room. In certain embodiments, the game mode is a survival mode, a battle royale mode, or a sandbox mode. In certain embodiments, the user may choose a battle mode to fight with other users, or choose a cooperative mode to collaborate with other users to perform the same task. In certain embodiments, the user chooses to turn on voting to select the best performing user in a round of the game (that is, the most valuable person, MVP), or select the user who has contributed the most in a round of the game, or select the most difficult round of the game. The voting function is not limited in the present disclosure. In certain embodiments, the user may select the default cover in the server, or the user uploads a picture locally as the cover of the server, or the user selects a picture from the network as the cover of the server.

The user uploads the game module through the upload game module 113. In an example, the user uploads a game module for quickly collecting plants and a game module for a 45-grid backpack. Upon configuration of the cloud room, the user clicks the option of OK 114, so that the configuration information of the cloud room takes effect. The option of cancel 115 is configured to cancel the configuration of the cloud room.

The user sets the name 116 of the cloud server or cloud room. In an example, the name of the proprietary server is a private server of wink. The operation status 117 of the cloud room is normal operation or abnormal operation. In an example, the operation status of the cloud room is uninitialized.

Figure 6:
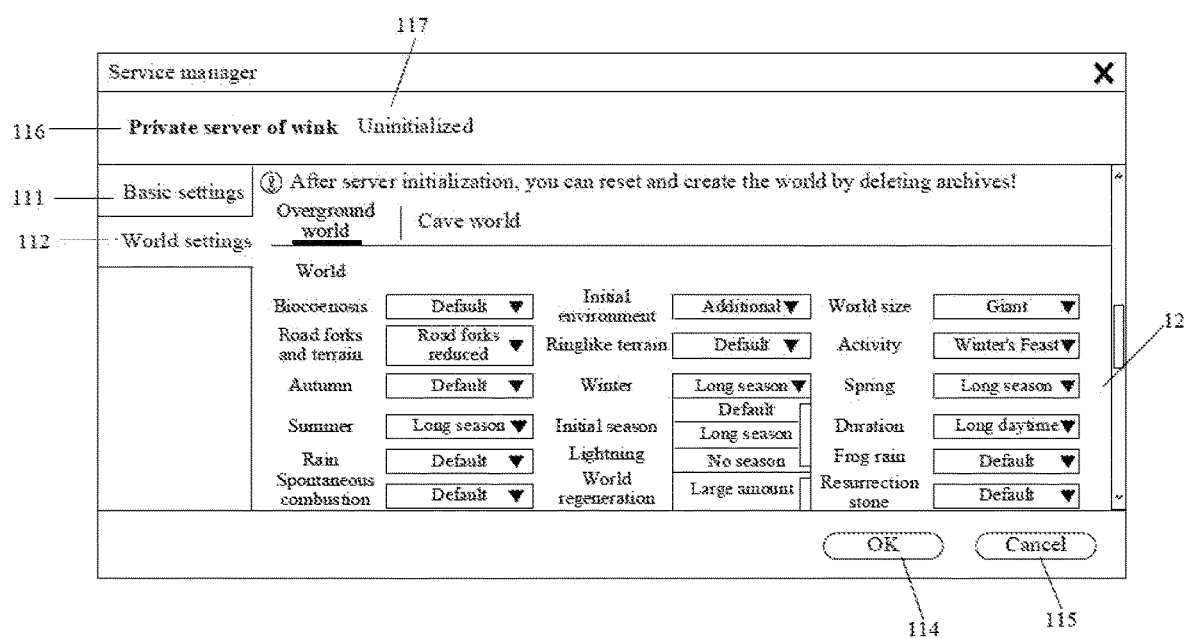
FIG. 6 is a schematic diagram of the interface of configuration information of the cloud room according to one or more embodiments of the present disclosure.

FIG. 6 is a schematic diagram of the interface of configuration information of the cloud room according to another exemplary embodiment of the present disclosure. The following options are displayed on the interface 12 of configuration information: basic setting 111, world setting 112, OK 114, cancel 115, name of cloud room (or name of proprietary server) 116, and status of cloud room (or status of proprietary server) 117.

The world setting 112 is used for setting an environment of a game world. In certain embodiments, the environment of the game world includes an overground world and a cave world. In some embodiments, the game world is a water world or a sky world, which is not limited in the present disclosure. In certain embodiments, the environment of the game world includes: at least one of terrain, biocoenosis, world sizes, seasons, weather, and activities performed. In certain embodiments, a default setting is provided for the environment of the game world. In an example, a road fork and a terrain are road forks reduced. The user may modify the configuration on the interface 12, and after modifying the configuration, close the cloud room, and the cloud server can read a new configuration of the cloud room and start the cloud room.

After configuring the cloud room 402, the cloud server 403 is initialized, and then the user enters the cloud room to play a multi-player game (that is, enters the cloud room to play the game 404).

Based on the above, the proprietary server installation program corresponding to a game type is installed, and the proprietary service program is configured in response to successful installation of the proprietary program, which simplifies the steps for users to create and configure the cloud room. When or in response to determining the proprietary server program may need to be modified, the user may only need to transmits virtual configuration information to the cloud server to implement modification of configuration of the proprietary server program.

The user may further modify the configuration 411 of the cloud room, and then close the cloud room 412 after triggering the above modification configuration 411, and then the cloud server reads the new configuration 413 and starts the cloud room 423 after completing the modification of the configuration information.

Figure 7:
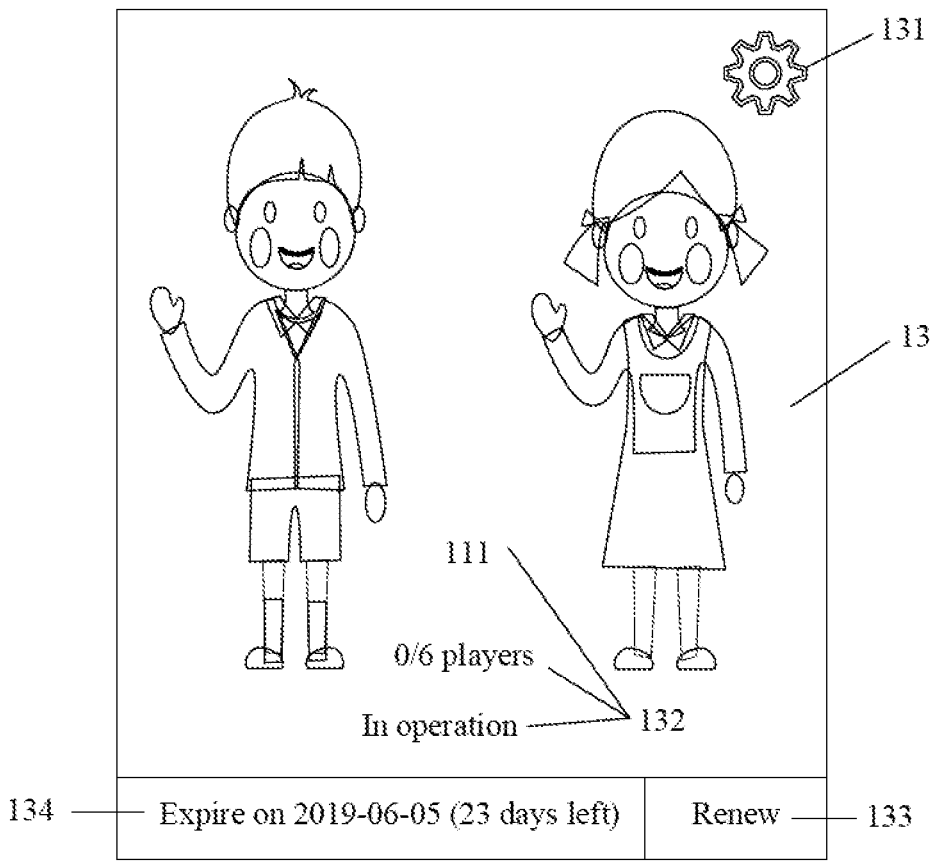
FIG. 7 is a schematic diagram of an interface of a cover of the cloud room according to one or more embodiments of the present disclosure.
Figure 8:
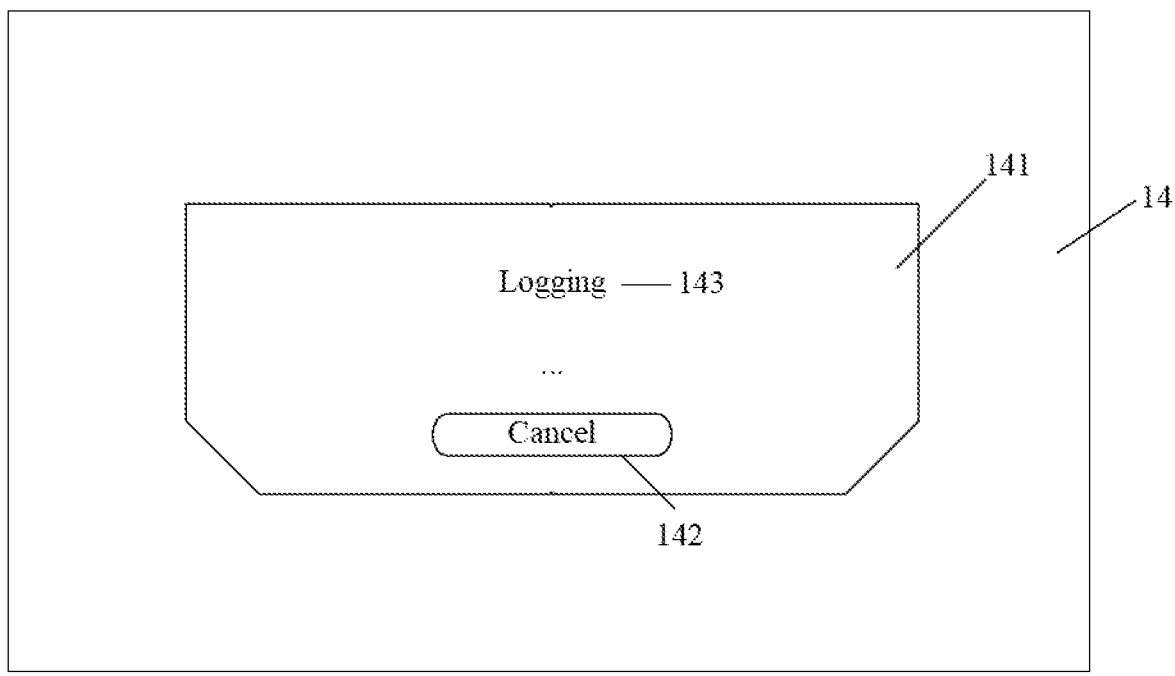
FIG. 8 is a schematic diagram of an interface of logging in to the cloud room according to one or more embodiments of the present disclosure.

The foregoing process is described below with reference to FIG. 7 and FIG. 8. FIG. 7 is a schematic diagram of an interface of a cover of the cloud room (or a cover of the cloud server) according to an exemplary embodiment of the present disclosure. Options including setting 131, basic information 132 of cloud room, renewal 133, and usage time of cloud room 134 are displayed on the interface 13 of the cover of the cloud room.

Figure 9:
FIG. 9 is a schematic diagram of an interface of configuration information of the cloud server according to one or more embodiments of the present disclosure.

The setting option 131 is configured to open the setting menu shown in FIG. 6 and FIG. 5 to set related parameters of the cloud room and related parameters of the game world. In certain embodiments, when or in response to determining the user enters the cloud room to play a multi-player game and is not satisfied with the configuration of the multi-player game or the cloud room, the user may directly click the setting option 131 to set the operating multi-player game or cloud room. In response to successful setting, the cloud server configures the cloud room without necessarily needing the user to close the cloud room first, and then starts the cloud room. During operation of the multi-player game, the setting option 131 is clicked, and the setting interface of the configuration information of the cloud room shown in FIG. 9 is displayed.

Basic information 132 of the cloud room includes: a name of the cloud room, a number of persons that can be accommodated in the cloud room, a number of persons that are actually connected to the cloud room, and an operation status of the cloud room. In an example, a name of the cloud room is 111, a number of persons that can be accommodated in the cloud room is six, a number of persons that are actually connected to the cloud room is zero, and an operation status of the cloud room is operating. In certain embodiments, the operation status of the cloud room may further be abnormal operation, please restore.

The option of renewal 133 is configured to renew the right to use the cloud room. In certain embodiments, the user receives a prompting message transmitted by the cloud server at a target moment before expiration of a validity period. In an example, the target moment before expiration of the validity period is the day before an expiration date, which is not limited in the present disclosure.

The usage time of the cloud room 134 represents the validity period of the right to use the cloud room, including a date of the validity period and the remaining time from the current date to the expiration date. In certain embodiments, the target moment of the validity period may be a date and a point in time. In certain embodiments, a unit of the remaining time may be day, hour, minute, second, millisecond, and the like, which is not limited in the present disclosure. In an example, the validity period for the cloud room expires on Jun. 5, 2019, and the time left from the date when the user purchases the cloud room to the expiration date of the validity period is 23 days.

The user can enter the game by triggering the interface 13 of the cover of the cloud room shown in FIG. 7. The interface 13 jumps to a game login interface 14. The game login interface 14 displays a login prompt box 141, a cancel option 142, and a login prompt message 143.

In certain embodiments, the login prompt box 141 is located at any position of the game login interface 14. In an example, the login prompt box 141 is in the middle of the game login interface 14. In certain embodiments, the login prompt box 141 is a circle, a rectangle, a triangle, a hexagon, a parallelogram, or a polygon. In an example, the login prompt box is a hexagon. A shape and a position of the login prompt box is not limited in the present disclosure.

In certain embodiments, the login prompt message 143 is logging in. In some embodiments, the login prompt message 143 is logging in, mounting, and loading. Specific content of the login prompt message is not limited in the present disclosure.

In certain embodiments, when or in response to determining the user enters the cloud room to play a multi-player game and is not satisfied with the configuration of the multi-player game or the cloud room, the user may directly click the setting option 131 to set the operating multi-player game or cloud room. In response to successful setting, the cloud server configures the cloud room without necessarily needing the user to close the cloud room first, and then starts the cloud room.

The user may further delete the configuration information stored in the cloud room, or delete information about the multi-player game stored in the cloud room (for example, parameters of the multi-player game and user records), that is, delete archives 414. after the user triggers the operation of deleting archives 414, the cloud room 415 is closed, and the cloud server deletes data of the cloud room 416. After the user reconfigures the cloud room 417 and initializes the server 418, the user can enter the cloud room to play games 419.

During operation of the multi-player game, the setting option 131 is clicked, and the setting interface of the configuration information of the cloud room shown in FIG. 9 is displayed. The following options are displayed on the setting interface 15: basic setting 111, world setting 112, name of cloud room 116, OK 114, cancel 115, name of cloud room 116, operation status 117 of cloud room, deactivate server 118, and delete archives 119.

In certain embodiments, the option of basic setting 111 is further configured to set related parameters of the cloud server. In an example, the related parameters of the cloud server include: a way to update the game version, a name of the server, information description of the server, and a password of the server. In some embodiments, the name of the server is that I am a cute guy (我是小可愛), which is not limited in the present disclosure. In certain embodiments, the user may set the password of the cloud server to protect the cloud server, or restrict members that enter the cloud room, which is not limited in the present disclosure.

The option of deactivate server 118 is configured to deactivate the cloud server. During the deactivation of the cloud server, the user cannot perform a multi-player game, and can perform the multi-player game only after restarting the cloud server. The option of delete archives 119 is configured to delete the data of the current game. Upon deletion, the user can reconfigure the cloud room or perform a multi-player game. After the user deletes archives 414 of the cloud room, the cloud server closes the cloud room 415, and the operation of deleting data 416 is successful. The user can choose to reconfigure the cloud room, which is the same as the method of initializing the server and entering the cloud room in the above embodiment. Details are not described herein again.

In certain embodiments, the cloud server further monitors a heartbeat signal with the room. The heartbeat signal is used for indicating an operation status of the cloud room. When the operation status of the cloud room is abnormal, the cloud room is closed or restarted. In this way, the abnormal status of the cloud room can be restored without manual intervention.

In some embodiments, the cloud server includes: a proprietary server purchase module 101, a proprietary server management module 102, a proprietary server program control module 103, a proprietary server program distribution module 104, a proprietary server database 105, and a proprietary server monitoring module 106. The modules of the above cloud server are configured to implement the method for providing a multi-player room in the above embodiments.

Based on the above, when or in response to determining there is an updating program for the proprietary server program, the cloud room is started by installing the proprietary server program, so that the cloud room automatically configures the updated proprietary server program without user intervention to update the proprietary server program.

Figure 10:
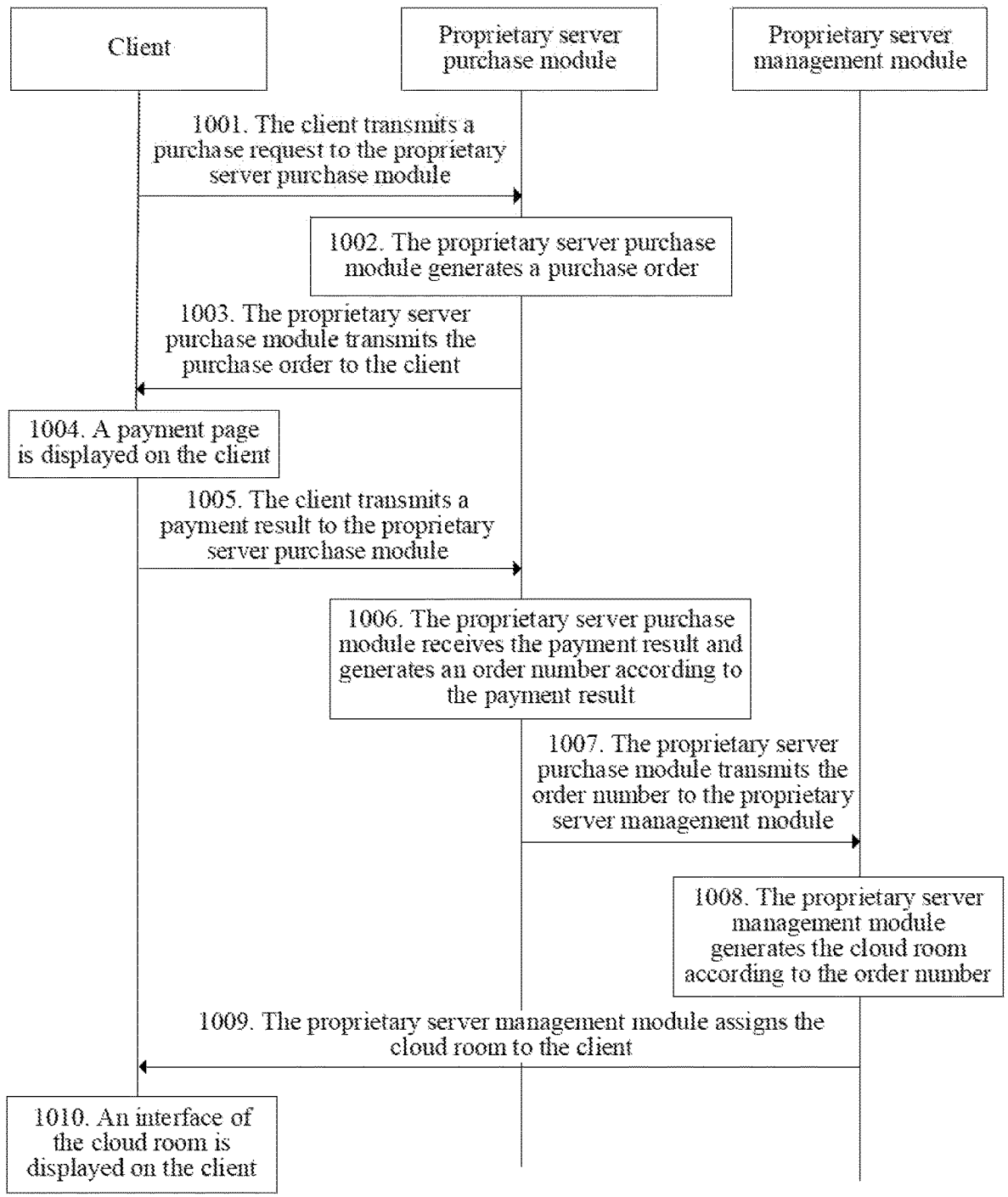
FIG. 10 is a flowchart of a method for purchasing a cloud room according to one or more embodiments of the present disclosure.

FIG. 10 is a flowchart of a method for purchasing a multi-player room according to another exemplary embodiment of the present disclosure. The method may be applicable to the cloud server cluster 140 shown in FIG. 1. The method includes the following steps:

Step 1001: A server transmits a purchase request to a proprietary server purchase module.

The server transmits the purchase request to the proprietary server purchase module, the purchase request being also a creation request of a cloud room. In certain embodiments, the purchase request may further be a lease request, a presenting request, a demand request, a claim request to participate in a lottery activity, and the like.

Step 1002: The proprietary server purchase module generates a purchase order.

The proprietary server purchase module generates the purchase order that is used for requesting the client to transfer a resource. The purchase order includes: at least one item of a room number corresponding to the cloud room, a login account of the cloud room, a login password of the cloud room, an account or nickname or user name of the user that purchases the cloud room, a payment method for purchasing the cloud room, a number of cloud rooms purchased, and a level of the cloud room purchased.

Step 1003: The proprietary server purchase module transmits the purchase order to a client.

The proprietary server purchase module transmits the generated purchase order to the client.

Step 1004: A payment page is displayed on the client.

The client pays for the purchase order according to the payment page. In certain embodiments, the payment may be performed by using cash, a savings card, a credit card, or through a third-party payment platform. The payment method is not limited in the present disclosure. When or in response to determining the user pays for the purchase order corresponding to the cloud room, resources required for the cloud room are transferred from a first account of the user to a second account of the cloud server.

Step 1005: The client transmits a payment result to the proprietary server purchase module.

Upon completion of payment on the client, the payment result is transmitted to the proprietary server purchase module. In certain embodiments, the payment result is successful payment or unsuccessful payment. In case of successful payment, step 1006 is performed. In case of unsuccessful payment, the client may choose to re-pay or abandon the current payment operation. If the current payment operation is abandoned, the user cannot obtain the right to use the cloud room.

Step 1006: The proprietary server purchase module receives the payment result and generates an order number according to the payment result.

In case of successful payment on the client, the proprietary server purchase module receives the payment result (successful payment) and generates an order number according to the payment result, the order number being in a one-to-one correspondence with the cloud room.

Step 1007: The proprietary server purchase module transmits the order number to a proprietary server management module.

The proprietary server purchase module transmits the order number to the proprietary server management module, the order number being in a one-to-one correspondence with the cloud room.

Step 1008: The proprietary server management module generates a cloud room according to the order number.

The proprietary server management module receives the order number and generates the cloud room according to the order number, that is, the proprietary server management module generates a cloud room according to the paid purchase order or the order number. In certain embodiments, users may purchase different types of cloud rooms. For example, cloud rooms are classified in ascending order of performance, including: low grade, medium grade, and high grade. Alternatively, cloud rooms are classified according to the number of persons that can be accommodate, for example, fewer than 10 persons, 10 to 30 persons, and more than 30 persons. In certain embodiments, the user may customize parameters of computing resources and storage resources of the cloud room. For example, the user may modify storage capacity of the cloud room by modifying the parameters of the storage resources. This is not limited in the present disclosure.

Step 1009: The proprietary server management module distributes the cloud room to the client.

The proprietary server management module generates a successful resource transfer indication, and the successful resource transfer indication being configured to create a cloud room. The proprietary server management module distributes the generated cloud room to the client, and the cloud room corresponds to the order number.

Step 1010: An interface of the cloud room is displayed on the client.

The client receives the cloud room and displays an initial interface of the cloud room. In certain embodiments, the cloud room has not been configured yet.

Based on the above, the cloud server can be purchased automatically through the above proprietary server purchase module. The proprietary server purchase module transmits order information corresponding to the cloud room (for example, an account number and verification code of the cloud room) to the client according to the purchase request of the client without manual intervention, which improves distribution efficiency of cloud rooms.

Figure 11:
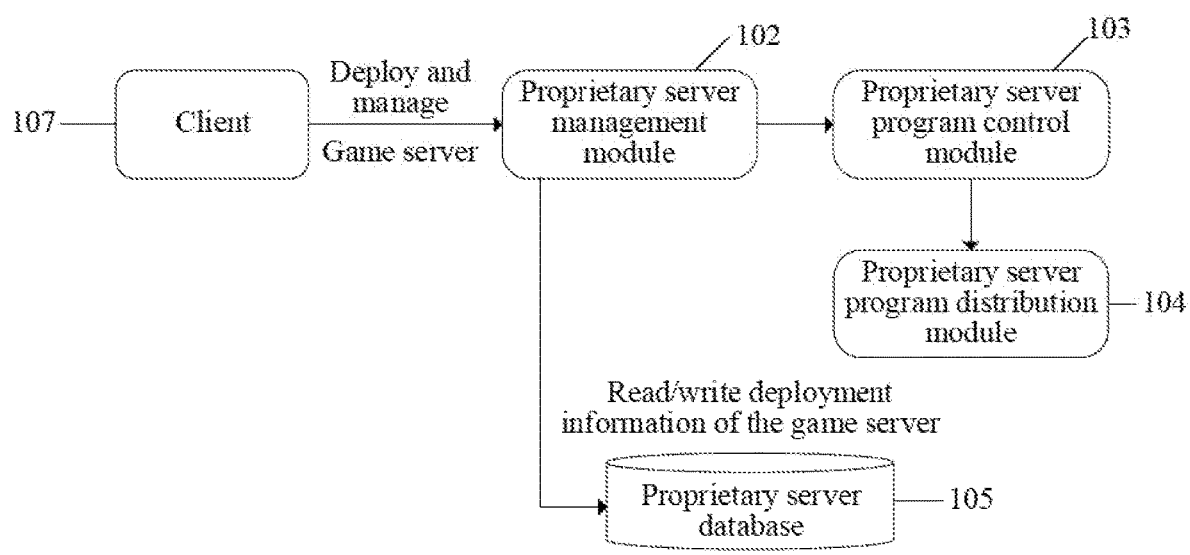
FIG. 11 is a block diagram of a system for creating and configuring a cloud room according to one or more embodiments of the present disclosure.

The creation and configuration of a cloud room is described with reference to FIG. 11. FIG. 11 is a schematic structural diagram of a system for providing a cloud room according to another exemplary embodiment of the present disclosure. The system includes: a client 107, a proprietary server management module 102, a proprietary server program control module 103, a proprietary server program distribution module 104, and a proprietary server database 105.

The client 107 transmits a creation request for a cloud room to the proprietary server management module 102, the creation request carrying configuration information of the cloud room. The proprietary server management module 102 generates a creation instruction for the cloud room. The proprietary server program control module 103 creates the cloud room according to the creation instruction. The proprietary server management module 102 generates an installation instruction according to a type of a multi-player game. The proprietary server program control module 103 installs a proprietary server program corresponding to the multi-player game in the cloud room according to the installation instruction. In an example, the proprietary server program control module 103 transmits a download instruction to the proprietary server distribution module. The download instruction is used by the proprietary server program control module 103 to query for the proprietary server program in the proprietary server program distribution module 104 and download the proprietary server program. The proprietary server management module 102 generates a configuration instruction corresponding to the cloud room in response to successful installation of the proprietary server program. The proprietary server program control module 103 configures the proprietary server program according to the configuration instruction.

When or in response to determining there is an updating program for the proprietary server program, the proprietary server management module 102 generates a closing instruction. The proprietary server program control module 103 closes the cloud room according to the closing instruction. The proprietary server management module 102 generates an updating instruction. The proprietary server program control module 103 install an updating program corresponding to the multi-player game in the cloud room according to the updating instruction. The proprietary server management module 102 generates a start instruction in response to successful updating. The proprietary server program control module 103 starts the cloud room according to the start instruction.

After the client is connected to the cloud room, the proprietary server management module 102 receives a configuration modification request for the cloud room that is transmitted by the client 107. The proprietary server management module 102 generates a closing instruction. The proprietary server program control module 103 closes the cloud room according to the closing instruction. The proprietary server management module 102 generates a configuration modification instruction according to the configuration modification request. The proprietary server program control module 103 modifies the configuration information of the cloud room according to the configuration modification instruction. The proprietary server management module 102 generates a start instruction in response to successful modification. The proprietary server program control module 103 starts the cloud room according to the start instruction.

The proprietary server program control module 103 receives a heartbeat signal of the cloud room that is used for indicating an operation status of the cloud room. The proprietary server management module 102 writes the heartbeat signal and the configuration information of the cloud room to the proprietary server database 105.

Based on the above, through the proprietary server management module 102 and the proprietary server program control module 103, the user can modify the configuration information of the cloud room without closing the cloud room, which simplifies the steps for the user to modify the configuration information of the cloud room.

Figure 12:
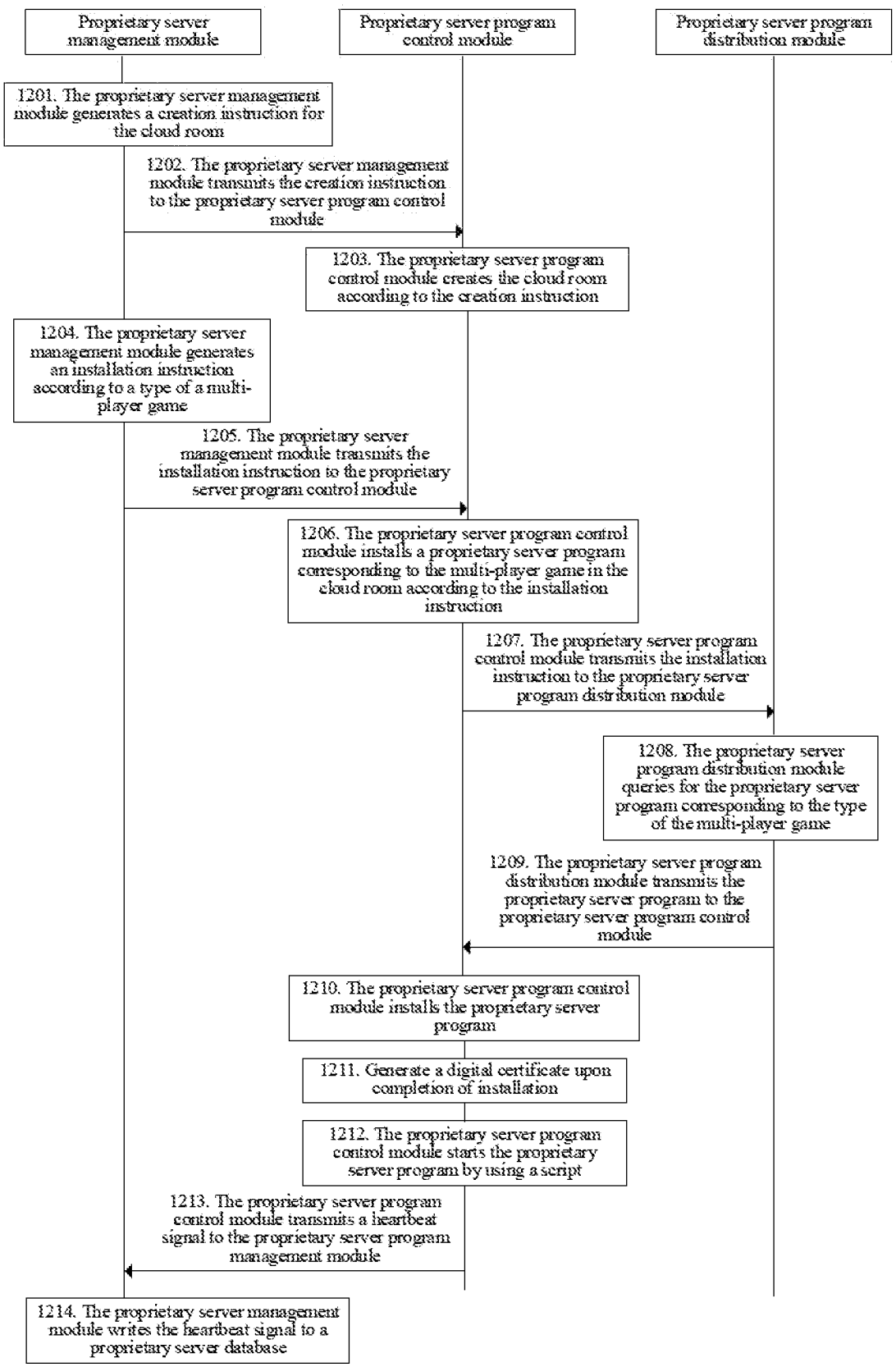
FIG. 12 is a flowchart of a method for installing a proprietary server program according to one or more embodiments of the present disclosure.

FIG. 12 is a flowchart of a method for configuring a cloud room according to another exemplary embodiment of the present disclosure. The method is applicable to the cloud server cluster 140 shown in FIG. 1, and the method includes the following steps.

Step 1201: A proprietary server management module generates a creation instruction for a cloud room.

The proprietary server management module generates the creation instruction for the cloud room according to a creation request for a cloud room that is transmitted by a client. The creation instruction is configured to create a cloud room and includes: at least one type of information such as a type of the cloud room, information about a purchaser of the cloud room (for example, an account or a user name or a nickname of the purchaser), a purchase order corresponding to the cloud room, a login account of the cloud room, a login password of the cloud room, a room number of the cloud room.

Step 1202: The proprietary server management module transmits the creation instruction to a proprietary server program control module.

For example, in a multi-player game A, the proprietary server management module generates a creation instruction according to the creation request of the client, and transmits the creation instruction to the proprietary server program control module. For example, the creation instruction includes: information such as a cloud room with mid-range performance, a creator called Little K, a room number 123 of a cloud room, a login name Little K of the cloud room, and the like.

Step 1203: The proprietary server program control module creates the cloud room according to the creation instruction.

The proprietary server program control module receives the creation instruction, and creates the cloud room according to the creation instruction.

For example, in a multi-player game B, the proprietary server program control module creates a cloud room according to the creation instruction that carries information such as the performance of the cloud room, the user name or account of the creator, and the like. For example, the cloud room is a cloud room with mid-range performance, the displayed name of the cloud room is Little M (in certain embodiments, the name of the cloud room is modified by the creator, and the creator can modify the name), and the room number of the cloud room is 310.

Step 1204: The proprietary server management module generates an installation instruction according to a type of a multi-player game.

The cloud room is configured after being created. The proprietary server management module generates an installation instruction according to a type of a multi-player game.

For example, in a multi-player game X, the multi-player game belongs to a type B and may need to be installed with an application program b. The proprietary server management module generates an installation instruction according to the type B, and the installation instruction is configured to install the application program b.

Step 1205: The proprietary server management module transmits the installation instruction to the proprietary server program control module.

The installation instruction is configured to install a proprietary server program corresponding to a multi-player game in the cloud room. The installation instruction includes: installing a name of a proprietary server program corresponding to a multi-player game in the cloud room and an installation package or a compressed package of a proprietary server program corresponding to a multi-player game. For example, the proprietary server management module transmits the installation instruction of installing a proprietary server program b in the cloud room to the proprietary server program control module.

Step 1206: The proprietary server program control module installs a proprietary server program corresponding to a multi-player game in the cloud room according to the installation instruction.

For example, in the multi-player game X, the proprietary server program control module installs the proprietary server program b in the cloud room according to the installation instruction.

Step 1207: The proprietary server program control module transmits the installation instruction to the proprietary server program.

For example, in the multi-player game X, the proprietary server program control module transmits the installation instruction of installing the proprietary server program b to the proprietary server program.

Step 1208: A proprietary server program distribution module queries for the proprietary server program corresponding to the type of the multi-player game.

For example, the proprietary server program distribution module queries a name, an identifier, or a sub-identifier corresponding to the proprietary server program according to the installation instruction, thereby implementing the installation of the corresponding proprietary server program for the multi-player game.

Table I is adopted to exemplify a correspondence between the type of the multi-player game, the identifier corresponding to the proprietary server program, and the proprietary server program below.

TABLE I

| Type of multi-player game | Identifier corresponding to a proprietary server program | Proprietary server program |
|---|---|---|
| Type A | 2019062621090001 | Program a |
| Type B | 2019062622000002 | Program b |

The identifier 2019062621090001 corresponding to the proprietary server program is configured to indicate the $0001^{st}$ proprietary server program at 21:09 on Jun. 26, 2019. The proprietary server program is program a, and a corresponding type of the multi-player game is type A.

Step 1209: The proprietary server program distribution module transmits the proprietary server program to the proprietary server program control module.

When or in response to determining the proprietary server program corresponding to the multi-player game is queried, the proprietary server program distribution module transmits the proprietary server program to the proprietary server program control module. In certain embodiments, when or in response to determining the proprietary server program is not queried according to the identifier corresponding to the proprietary server program, the proprietary server program distribution module transmits query failure information to the proprietary server program control module, the proprietary server program control module transmits the query failure information to the proprietary server management module, and the proprietary server management module transmits the query failure information to a user on the client. In certain embodiments, the user restarts the cloud server or reconfigures the cloud room according to the query failure information.

Step 1210: The proprietary server program control module installs the proprietary server program.

For example, the proprietary server program control module installs the proprietary server program b corresponding to the multi-player game X in the cloud room.

Step 1211: Perform the installation, and generate a digital certificate.

The digital certificate is generated upon installation of the proprietary server program.

The digital certificate is an electronic document issued by a certificate authority (CA), which includes a string of numbers that can indicate identity information of users in the network, and provides a way to verify the identity of users in the network. The digital certificate is also a digital identifier. The digital certificate ensures integrity and security of information and data in the form of encryption or decryption in the form of encryption or decryption of information and data exchanged by users through the network. The digital certificate is configured to verify whether the installed proprietary server program corresponds to the type of the multi-player game. For example, in the multi-player game X, after the proprietary server program b is installed, the proprietary server program generates a digital certificate that can verify that the proprietary server program b corresponds to the type B to which the multi-player game X belongs.

Step 1212: The proprietary server program control module starts the proprietary server program by using a script.

The script is a programming language that can be used for controlling an application program. A set procedure may be repeated by using a script. In an example, a type of scripting language is a lua script. For example, in the multi-player game X, the proprietary server program control module starts the proprietary server program b installed in the cloud room by using the lua script.

Step 1213: The proprietary server program control module transmits a heartbeat signal to the proprietary server program management module.

For example, in the multi-player game X, the proprietary server program control module transmits the heartbeat signal to the proprietary server program management module. The heartbeat signal includes an operation status of the proprietary server program b corresponding to the multi-player game X, operation statuses of the proprietary server program control module and the cloud room, and the like.

Step 1214: The proprietary server management module writes the heartbeat signal to the proprietary server database.

The proprietary server management module receives the heartbeat signal and writes the heartbeat signal to the proprietary server database. The heartbeat signal indicates the operation status of the cloud room. The proprietary server management module receives the heartbeat signal at a certain frequency. In certain embodiments, the frequency is in units of milliseconds, seconds, minutes, hours, days, weeks, months, years, and the like, which is not limited in the present disclosure. When or in response to determining the proprietary server management module does not receive the heartbeat signal within the specified frequency, the proprietary server management module may be disconnected from the proprietary server program control module, or the proprietary server management module cannot receive the heartbeat signal transmitted by the proprietary server program control module, or the proprietary server program control module cannot transmit the heartbeat signal.

Based on the above, the proprietary server management module is connected to the proprietary server program control module to install, manage, download, and update the proprietary server program, and the like, so that the configuration of the cloud room and the initialization of the cloud server can be performed. The client can directly modify the settings of the cloud room without closing the cloud room, and the cloud room can be automatically configured according to the setting operation.

Figure 13:
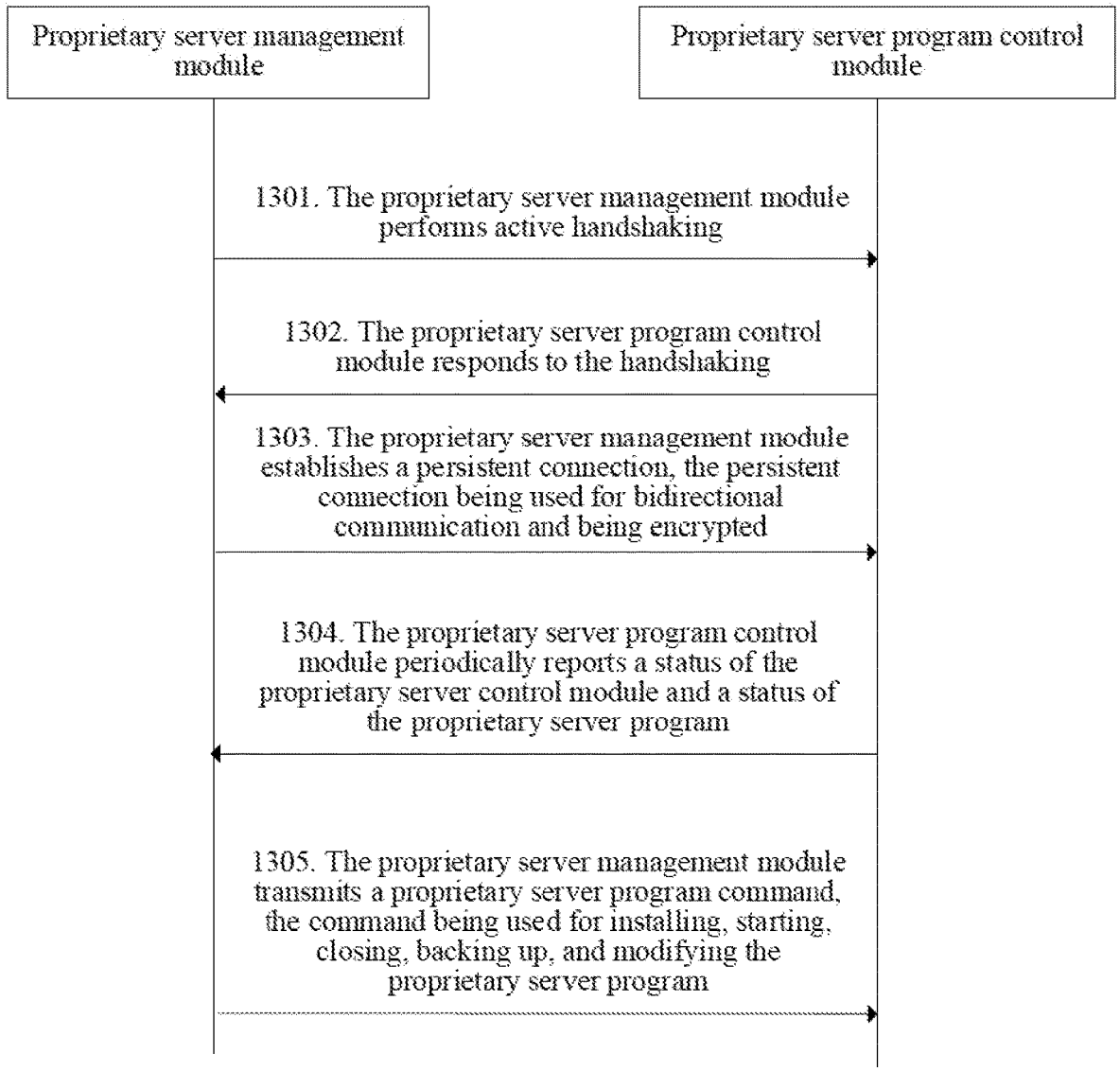
FIG. 13 is a flowchart of communication between a proprietary server management module and a proprietary server program control module according to one or more embodiments of the present disclosure.

FIG. 13 is a flowchart of communication between a proprietary server management module and a proprietary server program control module according to exemplary embodiment of the present disclosure.

Step 1301: The proprietary server management module performs active handshaking.

The proprietary server management module performs active handshaking with the proprietary server program control module. The handshaking is negotiating an amount of data transmitted each time to synchronize transmitting and receiving of a data segment, determining an amount of confirmed data according to the amount of received data, determining when to remove the connection after the data is transmitted and received, and establishing a connection.

Step 1302: The proprietary server program control module responds to the handshaking.

The proprietary server management module responds to the handshaking signal transmitted by the proprietary server program control module.

Step 1303: The proprietary server management module establishes a persistent connection, the persistent connection being used for bidirectional communication and being encrypted.

The persistent connection means that a plurality of data packets may be transmitted continuously in a connection. The persistent connection is mostly used in a case of frequent operations, point-to-point communication, and a small number of connections. The persistent connection is used for bidirectional communication and encrypted to ensure security of the information of both parties in the connection.

Step 1304: The proprietary server program control module periodically reports a status of the proprietary server control module and a status of the proprietary server program.

For example, in the multi-player game X, the proprietary server program control module periodically reports the status of the proprietary server control module and a status of the proprietary server program b corresponding to the multi-player game X. In certain embodiments, the period may be one minute, one hour, one day, one week, and the like. The period during which the proprietary server program control module reports the operation status is not limited in the present disclosure.

In certain embodiments, the above status is an operation status, and the operation status is in operation, normal operation, abnormal operation, and the like. For example, when or in response to determining the proprietary server program in the multi-player game X is in an abnormal operation, the proprietary server program control module reports the status of the proprietary server program b.

Step 1305: The proprietary server management module transmits a proprietary server program command, the command being used for installing, starting, closing, backing up, and modifying the proprietary server program.

The proprietary server management module transmits the proprietary server program command (or instruction) to the proprietary server program control module. The instruction includes an installation instruction, a start instruction, a closing instruction, a backup instruction (configured to update the proprietary server program), and a modification instruction (configured to modify the configuration of the cloud room or the game).

Based on the above, according to the method provided in this embodiment, the automated deployment and management of the cloud room is implemented through the communication between the two modules, which improves deployment efficiency and a success rate of the cloud room. In addition, after the proprietary server management module establishes a persistent connection to the proprietary server program control module, the proprietary server program control module reports the heartbeat signal to the proprietary server management module, and the proprietary server management module may push the status to the user, so that the user can obtain the status of the cloud room in time.

Figure 14:
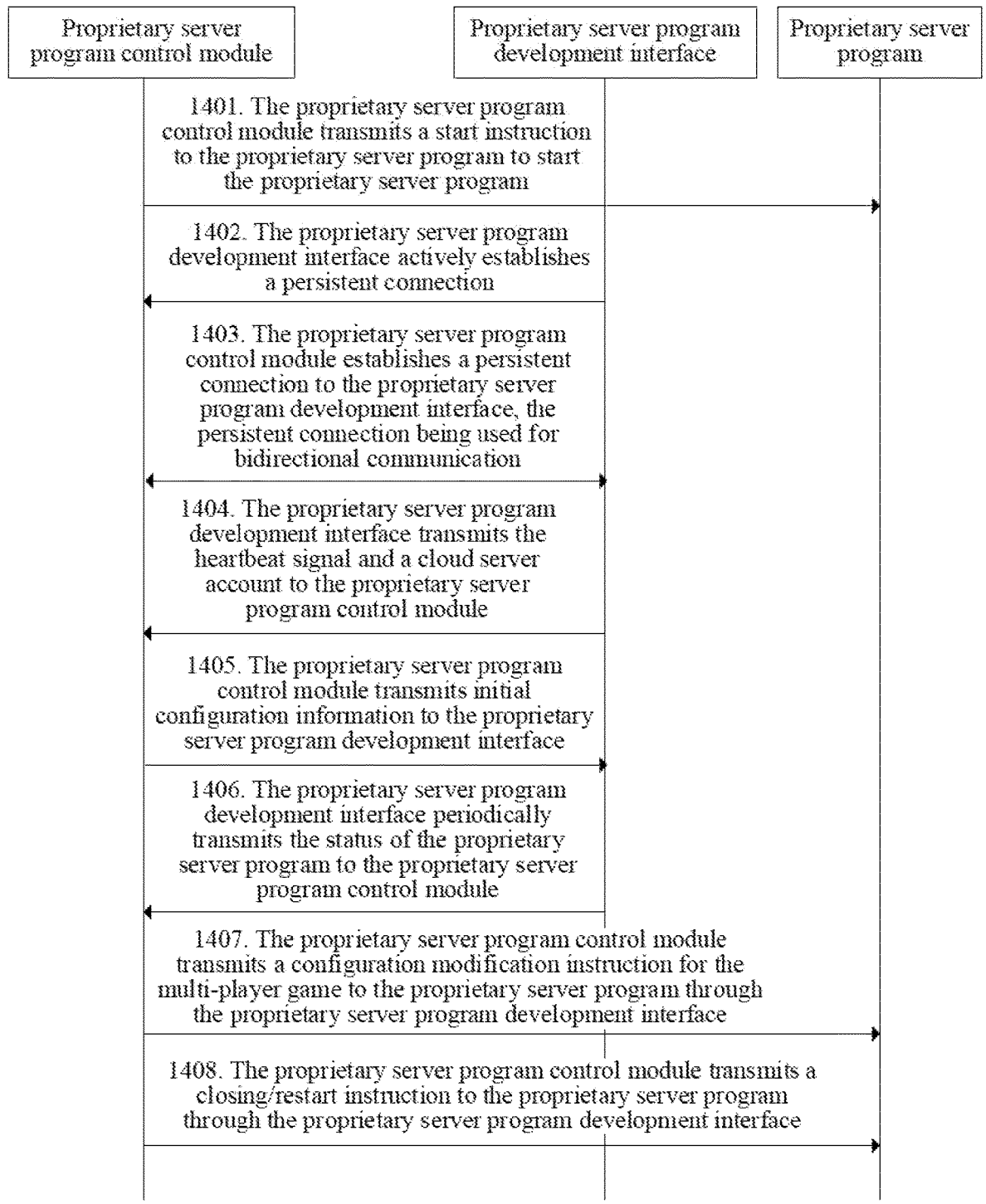
FIG. 14 is a flowchart of a method for installing a proprietary server program according to one or more embodiments of the present disclosure.

FIG. 14 is a flowchart of communication between a proprietary server program control module and a proprietary server program according to exemplary embodiment of the present disclosure.

Step 1401: The proprietary server program control module transmits a start instruction to the proprietary server program to start the proprietary server program.

The proprietary server program control module transmits the start instruction to the proprietary server program through the proprietary server program development interface, the start instruction being configured to start the proprietary server program. The proprietary server program development interface is an interface provided for a multi-player service platform, a game platform, a game developer, or a game supplier and capable of installing the proprietary server program, which is compatible with a plurality of types of proprietary server programs. For example, in the multi-player game X, the proprietary server program development interface is configured to connect the proprietary server program b, so that the proprietary server program control module can download the proprietary server program b.

Step 1402: The proprietary server program development interface actively establishes a persistent connection.

The proprietary server program development interface actively establishes a persistent connection to the proprietary server program control module.

Step 1403: The proprietary server program control module establishes a persistent connection to the proprietary server program development interface, the persistent connection being used for bidirectional communication.

For example, in the multi-player game X, the proprietary server program control module establishes a persistent connection to the proprietary server program development interface, the persistent connection being used for bidirectional communication, so that the connection between the proprietary server program b and the proprietary server program control module is stable and fast.

Step 1404: The proprietary server program development interface transmits the heartbeat signal and an account of the cloud server to the proprietary server program control module.

The proprietary server program transmits the heartbeat signal and an account of a game server to the proprietary server control module through the proprietary server program development interface. In some embodiments, the proprietary server program transmits an installation package of the proprietary server program corresponding to the type of the multi-player game to the proprietary server control module through the proprietary server program development interface. In certain embodiments, the account of the cloud server is randomly distributed by a multi-player lobby in the multi-player game. The multi-player lobby is configured to store different types of multi-player games. For example, the user performs a multi-player game Y. When or in response to determining the multi-player game belongs to type C, then the multi-player lobby randomly assigns an account of the cloud server to the multi-player game Y as yyy, and the proprietary server program development interface transmits an account of the cloud server to the proprietary server program control module as yyy.

Step 1405: The proprietary server program control module transmits initial configuration information to the proprietary server program development interface.

The proprietary server program development interface receives the initial configuration information transmitted by the proprietary server program control module. The information includes: a type of the multi-player game and an initialization configuration parameter. For example, the type of the multi-player game is B, the initialization configuration information is that a style of the multi-player game is to cooperate with other users in the multi-player game, and the game mode is a survival mode.

Step 1406: The proprietary server program development interface periodically transmits a status of the proprietary server program to the proprietary server program control module.

For example, the proprietary server program b is installed in the cloud room, and the proprietary server program development interface transmits the status of the proprietary server program b to the proprietary server program control module.

Step 1407: The proprietary server program control module transmits a configuration modification instruction for the multi-player game to the proprietary server program through the proprietary server program development interface.

The proprietary server program modifies the proprietary server program according to the configuration modification instruction for the multi-player game transmitted by the proprietary server program control module. The configuration modification instruction for the multi-player game includes: modifying at least one of a game mode of the multi-player game, a game style, an environment of a game world, and a number of users accommodated in the cloud room.

Step 1408: The proprietary server program control module transmits a closing or restart instruction to the proprietary server program through the proprietary server program development interface.

When or in response to determining there is an updating program for the proprietary server program, the proprietary server program control module transmits the closing instruction to the proprietary server program through the proprietary server program development interface, the closing instruction being configured to close the cloud room. When or in response to determining the proprietary server program control module updates the proprietary server program, the proprietary server program corresponding to the type of the multi-player game is installed in the cloud room. The proprietary server program control module transmits a start instruction to the proprietary server program in response to successful updating, the start instruction being configured to start the cloud room.

When or in response to determining the operation status of the cloud room is abnormal, the proprietary server program control module transmits a restart instruction to the proprietary server program. The restart instruction is configured to restart the cloud room. Alternatively, when or in response to determining the operation status of the cloud room is abnormal, the proprietary server program control module transmits the closing instruction to the proprietary server program, the closing instruction being configured to close the cloud room.

Based on the above, according to the method provided in this embodiment, the cloud server restarts or closes the cloud room when or in response to determining the cloud room is in an abnormal operation, to respond to the abnormality in a timely manner without manual intervention, which reduces the time it takes for the user due to the halted proprietary server program, improving user experience and greatly reducing costs of developers manually solving problems. In addition, the proprietary server program development interface can monitor more status of the proprietary server program, which is helpful for users or developers to quickly locate related problems in the cloud room.

Figure 15:
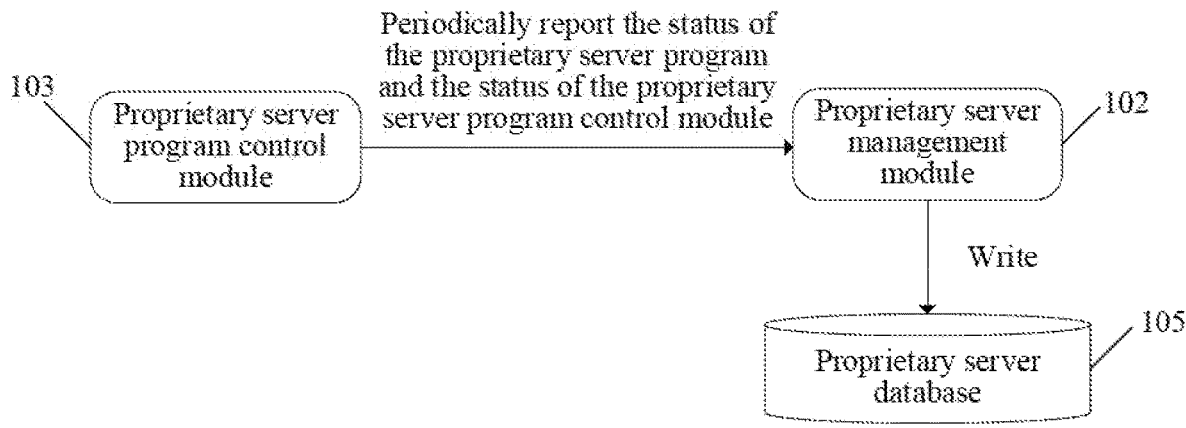
FIG. 15 is a block diagram of a system structure for obtaining a status of the proprietary server program according to one or more embodiments of the present disclosure.

FIG. 15 is a block diagram of a structure for obtaining a status of the proprietary server program according to an exemplary embodiment of the present disclosure. The structure for obtaining the status of the proprietary server program includes: a proprietary server management module 102, a proprietary server program control module 103, and a proprietary server database 105.

The proprietary server program control module 103 periodically reports the status of the proprietary server program and the status of the proprietary server program control module 103 to the proprietary server management module 102, and the proprietary server management module 102 writes the status to the proprietary server database 105 upon receipt of the status.

In certain embodiments, the status of the proprietary server program includes but is not limited to at least one of the following: an operation speed of the proprietary server program, a loading degree or speed when or in response to determining the proprietary server program is opened, normal operation of the proprietary server program, and abnormal operation of the proprietary server program (for example, abnormal phenomena such as the proprietary server program being stuck, the proprietary server program having no response after triggered by the user, the proprietary server program being halted, the proprietary server program crashing, and the like).

In certain embodiments, the status of the proprietary server program control module 103 includes but is not limited to at least one of the following: the proprietary server program management module 102 unable to start the proprietary server program, the proprietary server program control module 103 being disconnected from the proprietary server management module 102, the proprietary server program control module 103 being disconnected from the proprietary server program, the proprietary server program control module 103 unable to periodically report the above status, the proprietary server program control module 103 unable to configure the cloud room, the proprietary server program control module 103 unable to download or install the proprietary server program corresponding to the multiplayer game, and the like.

The proprietary server database 105 stores the status of the proprietary server program control module 103 and the status of the proprietary server program. The proprietary server management module 102 may read the status of the proprietary server program and the status of the proprietary server program control module 103 through the proprietary server database 105, and accordingly adjusts the read status. The proprietary server database 105 can efficiently read or write data, and coordinate with the proprietary server management module 102 and the proprietary server program control module 103, so that the cloud server operates more stably.

Figure 16:
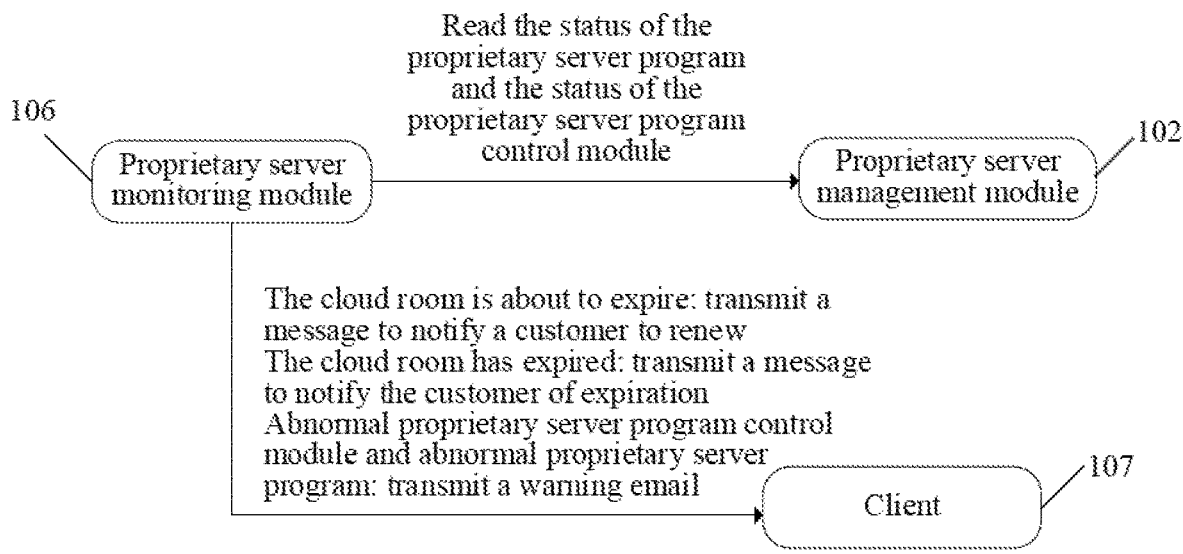
FIG. 16 is a block diagram of a system structure of a proprietary server monitoring module for monitoring the cloud room according to one or more embodiments of the present disclosure.

FIG. 16 is a block diagram of a structure for monitoring a status of the proprietary server program according to an exemplary embodiment of the present disclosure. The structure for monitoring the status of the proprietary server program includes: a proprietary server monitoring module 106, a proprietary server management module 101, and a client 105.

The proprietary server program control module 103 receives the heartbeat signal of the cloud room, the proprietary server management module 101 writes the heartbeat signal to the proprietary server database 105, and the proprietary server monitoring module 106 reads the heartbeat signal from the proprietary server database 105. The proprietary server monitoring module 106 monitors the heartbeat signal of the cloud room that is used for indicating an operation status of the cloud room. The heartbeat signal is transmitted to the proprietary server program control module at a certain frequency. The proprietary server management module 102 generates a restart instruction in response to the abnormal operation status of the cloud room, the restart instruction being configured to restart the cloud room, and the proprietary server program control module 103 restarts the cloud room according to the restart instruction.

In certain embodiments, when or in response to determining the cloud room is created by the client, a mobile phone number or an email address of a user on the client is used for registering an account for purchasing the cloud room, and the cloud server records the mobile phone number or the email address of the user. In certain embodiments, when or in response to determining the proprietary server program control module 103 is abnormal or the proprietary server program is abnormal, the proprietary server monitoring module 106 is configured to remind the client of the operation status of the cloud room by transmitting a warning email to the client; or remind the client of the operation status of the cloud room by transmitting a warning message to the client; or by dialing a phone number of the client; or by pushing information of the application program to the client. The form in which the proprietary server monitoring module 106 transmits the prompting message is not limited in the present disclosure.

The client is allowed to use the cloud room within a validity period, and the proprietary server monitoring module 106 monitors the validity period for the cloud room. The proprietary server monitoring module 106 transmits a prompting request to the client at a target moment before expiration of the validity period.

In certain embodiments, the proprietary server monitoring module 106 transmits a message to the client at the target moment before expiration of the validity period for the cloud room to notify the client of the validity period of usage time of the cloud room, for example, to remind the client of three days left within the validity period of the usage time of the cloud room. In some embodiments, the proprietary server monitoring module 106 transmits the validity period of the usage time to the client by pushing the information of the application program. In certain embodiments, the target moment before expiration of the validity period is one day or three days before an expiration date of the validity period. In some embodiments, the target moment before expiration of the validity period is one week before the expiration date of the validity period. This is not limited in the present disclosure. The proprietary server monitoring module 106 transmits a message to the client to notify the client that the usage time of the cloud room has exceeded the validity period when or in response to determining the usage time of the cloud room expires. In certain embodiments, the validity period exceeding the usage time of the cloud room is one day, three days, or a week, the prompting method is a prompting email, or a prompting message, or a prompting call, or transmitting a prompting message by means of pushing information of the application program, which is not limited in the present disclosure. The client can perform the renewal operation on the cloud room upon receipt of the prompting notification, or does not perform the renewal operation. When or in response to determining the client performs the renewal operation on the cloud room, the cloud room can be used again. If the client does not perform the renewal operation in time, the cloud server retains the configuration information of the cloud room or the related parameters of the game for the client within a period of time. In certain embodiments, the period of time is one day, three days, one week, or ten days. In some embodiments, the period of time is fifteen days, which is not limited in the present disclosure.

Based on the above, the proprietary server monitoring module 106 monitors the status of the proprietary server program control module 103 and the status of the proprietary server program, so that the user can learn the operation status of the cloud room at any time, and make adjustment according to the operation status to meet the requirement of the user.

Apparatus embodiments of the present disclosure are described below. For details that are not described in detail in the apparatus embodiments, reference may be made to the corresponding records in the foregoing method embodiments, and details are not described herein again.

Figure 17:
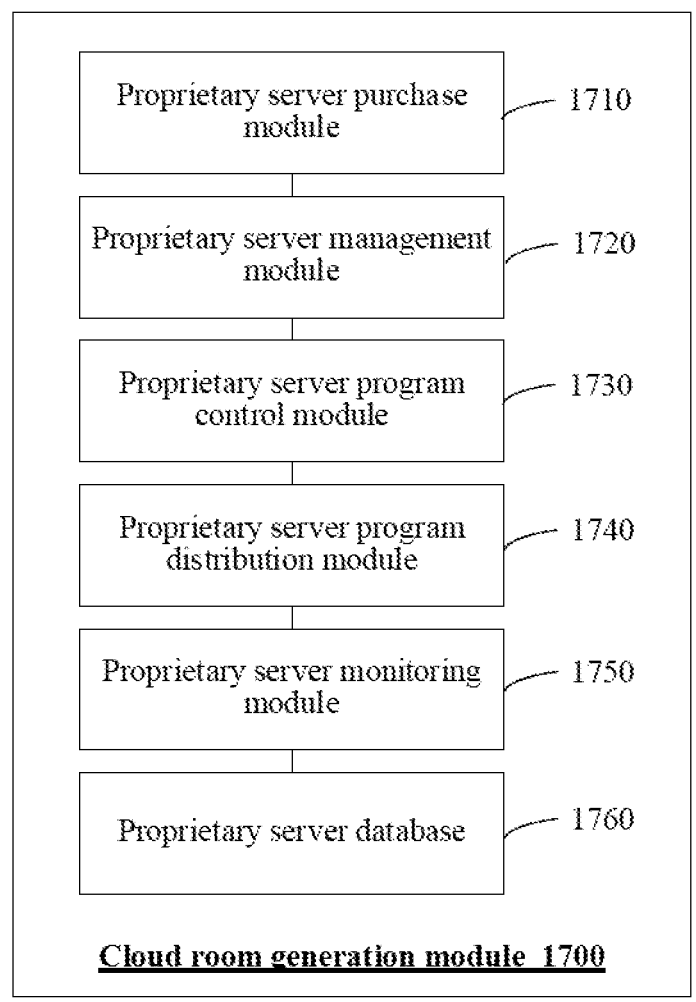
FIG. 17 is a schematic structural diagram of an apparatus for providing a multi-player room according to one or more embodiments of the present disclosure.

FIG. 17 is a schematic structural diagram of an apparatus for providing a multi-player room according to an exemplary embodiment of the present disclosure. The apparatus may be implemented as all or a part of a terminal through software, hardware or a combination of the two, and the apparatus includes a cloud room generation module;

The cloud room generation module being configured to receive a creation request for a cloud room that is transmitted by a client, the creation request carrying configuration information of the cloud room, the cloud room being used by at least two clients to perform a multi-player game; the cloud room generation module being configured to create and configure the cloud room in a cloud server according to the configuration information; the cloud room generation module being configured to receive an access request for the cloud room that is transmitted by the client; and the cloud room generation module being configured to start the cloud room according to the access request, and connect the client to the cloud room.

The apparatus includes: a proprietary server purchase submodule 1710, a proprietary server management submodule 1720, a proprietary server program control submodule 1730, a proprietary server program distribution submodule 1740, a proprietary server monitoring submodule 1750, and a proprietary server database 1760.

In an optional example, the proprietary server management submodule 1720 is configured to generate a creation instruction for a cloud room; the proprietary server program control submodule 1730 is configured to create the cloud room according to the creation instruction; the proprietary server management submodule 1720 is configured to generate an installation instruction according to a type of a multi-player game; the proprietary server program control submodule 1730 is configured to install a proprietary server program corresponding to the multi-player game in the cloud room according to the installation instruction; the proprietary server program control submodule 1730 is configured to generate a configuration instruction for the cloud room in response to successful installation of the proprietary server program; and the proprietary server program control submodule 1730 is configured to configure the proprietary server program according to the configuration instruction.

In an optional example, the proprietary server management submodule 1720 is configured to generate a closing instruction; the proprietary server program control submodule 1730 is configured to close the cloud room according to the closing instruction; the proprietary server management submodule 1720 is configured to generate an updating instruction; the proprietary server program control submodule 1730 is configured to install an updating program corresponding to the multi-player game in the cloud room according to the updating instruction; the proprietary server management submodule 1720 is configured to generate a start instruction in response to successful updating; and the proprietary server program control submodule 1730 is configured to start the cloud room according to the start instruction.

In an optional example, the proprietary server purchase submodule 1710 is configured to generate a purchase order for the cloud room; the proprietary server purchase submodule 1710 is configured to transmit the purchase order to the client that is used for requesting the client to transfer a resource; the proprietary server purchase submodule 1710 is configured to transmit the purchase order to the proprietary server management submodule 1720; the proprietary server management submodule 1720 is configured to transfer the resource corresponding to the purchase order according to the purchase order; the proprietary server management submodule 1720 is configured to generate a successful resource transfer indication; and the proprietary server program control submodule 1730 is configured to create the cloud room according to the successful resource transfer indication.

In an optional example, the proprietary server management submodule 1720 is configured to receive a configuration modification request for the cloud room that is transmitted by the client; the proprietary server management submodule 1720 is configured to generate a closing instruction; the proprietary server program control submodule 1730 is configured to close the cloud room according to the closing instruction; the proprietary server management submodule 1720 is configured to generate a configuration modification instruction according to the configuration modification request; the proprietary server program control submodule 1730 is configured to modify configuration information of the cloud room according to the configuration modification instruction; the proprietary server management submodule 1720 is configured to generate a start instruction in response to successful modification of the configuration information of the cloud room; and the proprietary server program control submodule 1730 is configured to start the cloud room according to the start instruction.

In an optional example, the proprietary server program control submodule 1730 is configured to receive a heartbeat signal of the cloud room that is used for indicating an operation status of the cloud room; the proprietary server management submodule 1720 is configured to write the heartbeat signal to the proprietary server database 1760; the proprietary server monitoring submodule 1750 is configured to read the heartbeat signal from the proprietary server database 1760; the proprietary server management submodule 1720 is configured to generate a closing instruction in response to an abnormal operation status of the cloud room; the proprietary server program control submodule 1730 is configured to close the cloud room according to the closing instruction; or the proprietary server management submodule 1720 is configured to generate a restart instruction in response to the abnormal operation status of the cloud room; and the proprietary server program control submodule 1730 is configured to restart the cloud room according to the restart instruction.

In an optional example, the proprietary server monitoring submodule 1750 is configured to monitor a validity period for the cloud room; and the proprietary server monitoring submodule 1750 is further configured to transmit a prompting request to the client at a target moment before expiration of the validity period.

Based on the above, according to the apparatus provided in this embodiment, the client creates and configures the cloud room in the cloud server, so that at least two clients can perform the multi-player service. When or in response to determining different types of multi-player services may need to be performed, the client may only need to transmit the configuration information corresponding to the type of the multi-player service to the cloud server to perform different types of multi-player services in the cloud room, avoiding the problem that the client may need to recreate the cloud room according to different types of multi-player services.

Figure 18:
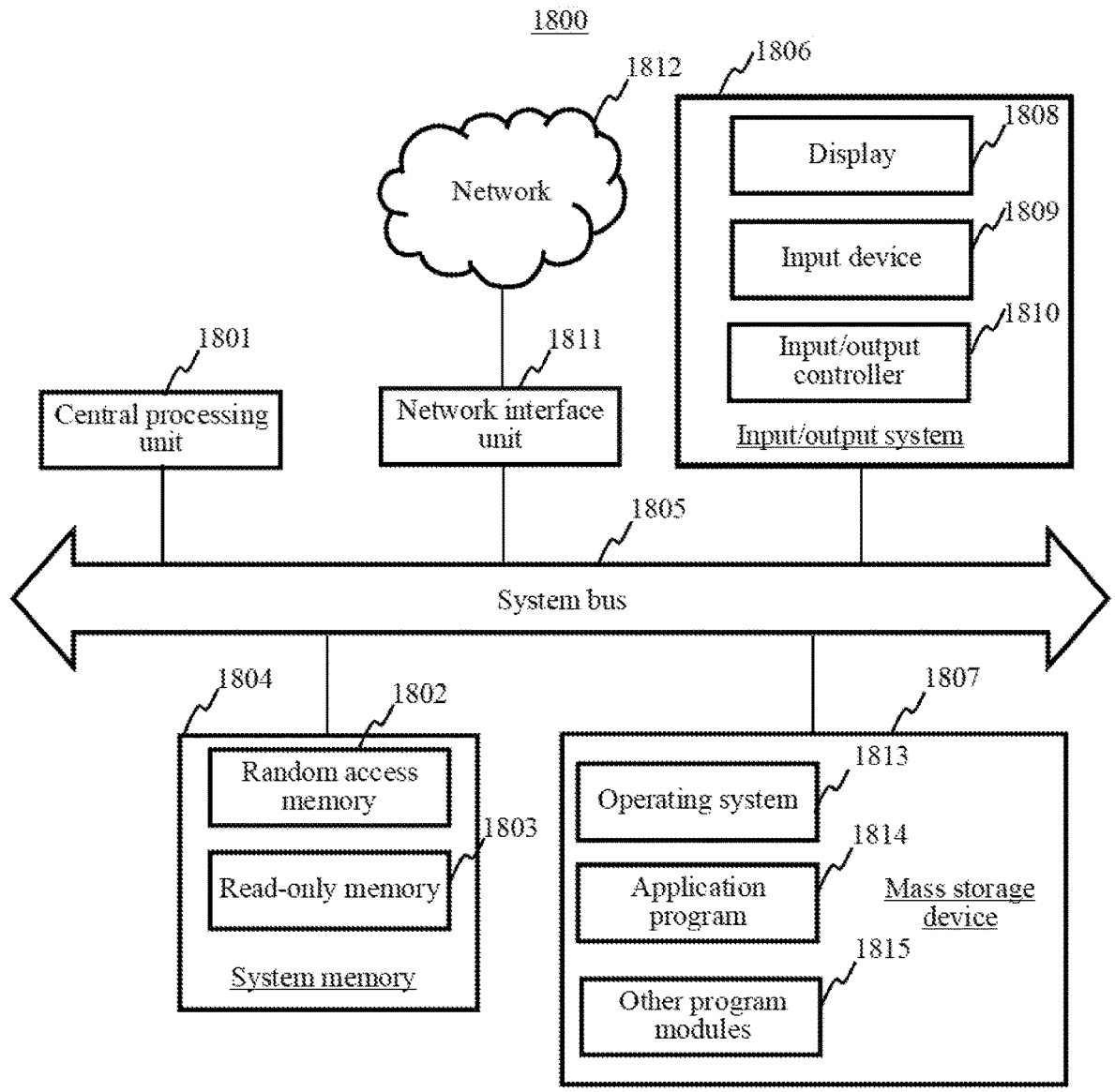
FIG. 18 is a schematic diagram of a structure of an apparatus of a server according to one or more embodiments of the present disclosure.

A structure of a server in the embodiment of the present disclosure is described below. FIG. 18 is a schematic diagram of a structure of a server according to an embodiment of the present disclosure. Specifically, a server 1800 includes a central processing unit (CPU) 1801, a system memory 1804 including a random access memory (RAM) 1802 and a read-only memory (ROM) 1803, and a system bus 1805 connecting the system memory 1804 and the CPU 1801. The server 1800 further includes a basic I/O system 1806 for transmitting information between components in a computer, and a mass storage device 1807 used for storing an operating system 1813, an application program 1814, and another program module 1815.

The basic I/O system 1806 includes a monitor 1808 configured to display information and an input device 1809 such as a mouse or a keyboard that is configured for information inputting by a user. The display 1808 and the input device 1809 are both connected to the CPU 1801 by using an input/output controller 1810 connected to the system bus 1805. The basic I/O system 1806 may further include the input/output controller 1810, to receive and process inputs from a plurality of other devices, such as the keyboard, the mouse, or an electronic stylus. Similarly, the I/O controller 1810 further provides an output to a display screen, a printer, or another type of output device.

The mass storage device 1807 is connected to the CPU 1801 by using a large-capacity storage controller (not shown) connected to the system bus 1805. The mass storage device 1807 and an associated computer-readable medium provide non-volatile storage for the server 1800. That is, the mass storage device 1807 may include a computer-readable medium (not shown) such as a hard disk or a compact disc ROM (CD-ROM) drive.

Without loss of generality, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. In certain embodiments, a person skilled in the art may learn that the computer storage medium is not limited to the foregoing several types. The system memory 1804 and the mass storage device 1807 may be collectively referred to as a memory.

According to the embodiments of the present disclosure, the server 1800 may further be connected, by using a network such as the Internet, to a remote computer on the network and run. That is, the server 1800 may be connected to a network 1812 by using a network interface unit 1811 connected to the system bus 1805, or may be connected to another type of network or a remote computer system (not shown) by using a network interface unit 1811.

The present disclosure further provides a computer device. The computer device includes: a processor and a memory storing at least one instruction, at least one program, a code set, or an instruction set, the at least one instruction, the at least one program, the code set, or the instruction set being loaded and executed by the processor to implement the method for providing a multi-player room provided in the above method embodiments.

The present disclosure further provides a computer-readable storage medium storing at least one instruction, at least one program, a code set, or an instruction set, the at least one instruction, the at least one program, the code set, or the instruction set being loaded and executed by a processor to implement the method for providing a multi-player room provided in the above method embodiments.

The present disclosure further provides a computer program product. The computer program product includes at least one instruction, at least one program, a code set, or an instruction set, the at least one instruction, the at least one program, the code set, or the instruction set being loaded and executed by a processor to implement the method for providing a multi-player room described in the above aspect.

"Plurality of" mentioned in the present disclosure means two or more. "And/or" describes an association relationship for describing associated objects and represents that three relationships may exist. For example, A and/or B may represent the following three cases: Only A exists, both A and B exist, and only B exists. The character "/" in present disclosure generally indicates an "or" relationship between the associated objects.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for providing a cloud room, applicable to a cloud server, the method comprising:
   receiving from a client a creation request for the cloud room, the creation request carrying configuration information of the cloud room, the cloud room being used by at least two clients to perform a multi-player service;
   creating and configuring the cloud room in the cloud server according to the configuration information;
   receiving from the client an access request for the cloud room;
   starting the cloud room according to the access request, and connecting the client to the cloud room;
   receiving a configuration modification request for the cloud room transmitted by the client;
   modifying the configuration information of the cloud room according to the configuration modification request; and
   operating the cloud room in response to successful modification of the configuration information of the cloud room.

2. The method according to claim 1, wherein the configuration information includes a type of the multi-player service and an initialization configuration parameter; and
   creating and configuring the cloud room in the cloud server comprises:
   creating the cloud room in the cloud server;
   installing a proprietary server program corresponding to the multi-player service in the cloud room according to the type of the multi-player service; and
   starting the proprietary server program in response to successful installation of the proprietary server program, and configuring the proprietary server program.

3. The method according to claim 2, wherein the cloud server includes a proprietary server management program and a proprietary server program control program, and the method further comprises:
   invoking the proprietary server management program to generate a creation instruction for the cloud room;
   invoking the proprietary server program control program to create the cloud room according to the creation instruction;
   invoking the proprietary server management program to generate an installation instruction according to the type of the multi-player service;
   invoking the proprietary server program control program to install the proprietary server program corresponding to the multi-player service in the cloud room according to the installation instruction;
   invoking the proprietary server program control program to generate a configuration instruction for the cloud room in response to the successful installation of the proprietary server program; and
   invoking the proprietary server program control program to configure the proprietary server program according to the configuration instruction.

4. The method according to claim 2, wherein the method further comprises:
   closing the cloud room in response to presence of an updating program for the proprietary server program;
   installing the updating program corresponding to the multi-player service in the cloud room according to the type of the multi-player service; and
   starting the cloud room in response to successful updating.

5. The method according to claim 4, wherein the cloud server includes a proprietary server management program and a proprietary server program control program, and the method further comprises:
   invoking the proprietary server management program to generate a closing instruction;
   invoking the proprietary server program control program to close the cloud room according to the closing instruction;
   invoking the proprietary server management program to generate an updating instruction;
   invoking the proprietary server program control program to install the updating program corresponding to the multi-player service in the cloud room according to the updating instruction;
   invoking the proprietary server management program to generate a start instruction in response to the successful updating; and
   invoking the proprietary server program control program to start the cloud room according to the start instruction.

6. The method according to claim 2, wherein the creation request is a purchase request, and creating the cloud room in the cloud server comprises:
   generating a purchase order for the cloud room according to the purchase request;
   transmitting the purchase order to the client that is used for requesting the client to transfer a resource; and
   creating the cloud room in the cloud server in response to a successful transfer of the resource corresponding to the purchase order.

7. The method according to claim 6, wherein the cloud server further includes a proprietary server purchase program and a proprietary server management program, and the method further comprises:
   invoking the proprietary server purchase program to generate the purchase order for the cloud room;
   invoking the proprietary server purchase program to transmit the purchase order to the client that is used for requesting the client to transfer the resource;
   invoking the proprietary server purchase program to transmit a paid purchase order to the proprietary server management program in response to the successful transfer of the resource corresponding to the purchase order;
   invoking the proprietary server management program to generate a successful resource transfer indication according to the paid purchase order; and
   invoking the proprietary server program control program to create the cloud room according to the successful resource transfer indication.

8. The method according to claim 1, further comprising:
after receiving the configuration modification request, closing the cloud room before modifying the configuration information of the cloud room; and
starting the cloud room in response to the successful modification of the configuration information of the cloud room.

9. The method according to claim 8, wherein the cloud server further includes a proprietary server management program and a proprietary server program control program, and the method further comprises:
after receiving the configuration modification request, invoking the proprietary server management program to generate a closing instruction;
invoking the proprietary server program control program to close the cloud room according to the closing instruction;
invoking the proprietary server management program to generate a start instruction in response to the successful modification of the configuration information of the cloud room; and
invoking the proprietary server program control program to start the cloud room according to the start instruction.

10. The method according to claim 1, wherein the cloud server further includes a proprietary server management program and a proprietary server program control program, and the method further comprises:
invoking the proprietary server management program to receive the configuration modification request for the cloud room that is transmitted by the client;
invoking the proprietary server management program to generate a configuration modification instruction according to the configuration modification request; and
invoking the proprietary server program control program to modify the configuration information of the cloud room according to the configuration modification instruction.

11. The method according to claim 1, further comprising:
monitoring a heartbeat signal of the cloud room, the heartbeat signal indicating an operation status of the cloud room; and
closing the cloud room or restarting the cloud room in response to an abnormal operation status of the cloud room.

12. The method according to claim 11, wherein the cloud server further includes a proprietary server monitoring program and a proprietary server database, and the method further comprises:
invoking the proprietary server program control program to receive the heartbeat signal of the cloud room that is used for indicating the operation status of the cloud room;
invoking the proprietary server management program to write the heartbeat signal to the proprietary server database;
invoking the proprietary server monitoring program to read the heartbeat signal from the proprietary server database; and
invoking the proprietary server management program to generate a closing instruction in response to the abnormal operation status of the cloud room, and invoking the proprietary server program control program to close the cloud room according to the closing instruction; or
invoking the proprietary server management program to generate a restart instruction in response to the abnormal operation status of the cloud room, and invoking the proprietary server program control program to restart the cloud room according to the restart instruction.

13. The method according to claim 1, wherein the client is allowed to use the cloud room within a validity period, and the method further comprises:
monitoring the validity period for the cloud room; and
transmitting a prompting request to the client at a target moment before expiration of the validity period.

14. An apparatus for providing a cloud room, the apparatus comprising: a memory storing computer program instructions; and at least one processor coupled to the memory and configured to execute the computer program instructions and perform:
receiving from a client a creation request for the cloud room, the creation request carrying configuration information of the cloud room, the cloud room being used by at least two clients to perform a multi-player service;
creating and configuring the cloud room in the cloud server according to the configuration information;
receiving from the client an access request for the cloud room;
starting the cloud room according to the access request, and connecting the client to the cloud room;
receiving a configuration modification request for the cloud room transmitted by the client;
modifying the configuration information of the cloud room according to the configuration modification request; and
operating the cloud room in response to successful modification of the configuration information of the cloud room.

15. The apparatus according to claim 14, wherein the configuration information includes a type of the multi-player service and an initialization configuration parameter; and wherein the at least one processor is further configured to execute the computer program instructions and perform:
creating the cloud room in the cloud server;
installing a proprietary server program corresponding to the multi-player service in the cloud room according to the type of the multi-player service; and
starting the proprietary server program in response to successful installation of the proprietary server program, and configuring the proprietary server program.

16. The apparatus according to claim 15, wherein the cloud server includes a proprietary server management program and a proprietary server program control program, and wherein the at least one processor is further configured to execute the computer program instructions and perform:
invoking the proprietary server management program to generate a creation instruction for the cloud room;
invoking the proprietary server program control program to create the cloud room according to the creation instruction;
invoking the proprietary server management program to generate an installation instruction according to the type of the multi-player service;
invoking the proprietary server program control program to install the proprietary server program corresponding to the multi-player service in the cloud room according to the installation instruction;
invoking the proprietary server program control program to generate a configuration instruction for the cloud room in response to the successful installation of the proprietary server program; and invoking the proprietary server program control program to configure the proprietary server program according to the configuration instruction.

17. The apparatus according to claim 15, wherein the at least one processor is further configured to execute the computer program instructions and perform:
closing the cloud room in response to presence of an updating program for the proprietary server program;
installing the updating program corresponding to the multi-player service in the cloud room according to the type of the multi-player service; and
starting the cloud room in response to successful updating.

18. The apparatus according to claim 16, wherein the creation request is a purchase request, and wherein the at least one processor is further configured to execute the computer program instructions and perform:
generating a purchase order for the cloud room according to the purchase request;
transmitting the purchase order to the client that is used for requesting the client to transfer a resource; and
creating the cloud room in the cloud server in response to a successful transfer of the resource corresponding to the purchase order.

19. The apparatus according to claim 18, wherein the cloud server further includes a proprietary server purchase program and a proprietary server management program, and wherein the at least one processor is further configured to execute the computer program instructions and perform:
invoking the proprietary server purchase program to generate the purchase order for the cloud room;
invoking the proprietary server purchase program to transmit the purchase order to the client that is used for requesting the client to transfer the resource;
invoking the proprietary server purchase program to transmit a paid purchase order to the proprietary server management program in response to the successful transfer of the resource corresponding to the purchase order;
invoking the proprietary server management program to generate a successful resource transfer indication according to the paid purchase order; and
invoking the proprietary server program control program to create the cloud room according to the successful resource transfer indication.

20. A non-transitory computer-readable storage medium storing computer program instructions executable by at least one processor to perform:
receiving from a client a creation request for the cloud room, the creation request carrying configuration information of the cloud room, the cloud room being used by at least two clients to perform a multi-player service;
creating and configuring the cloud room in the cloud server according to the configuration information;
receiving from the client an access request for the cloud room;
starting the cloud room according to the access request, and connecting the client to the cloud room;
receiving a configuration modification request for the cloud room transmitted by the client;
modifying the configuration information of the cloud room according to the configuration modification request; and
operating the cloud room in response to successful modification of the configuration information of the cloud room.

* * * * *